United States Patent
Andrei et al.

(10) Patent No.: US 9,881,041 B2
(45) Date of Patent: Jan. 30, 2018

(54) MULTIPLE RID SPACES IN A DELTA-STORE-BASED DATABASE TO SUPPORT LONG RUNNING TRANSACTIONS

(71) Applicants: Mihnea Andrei, Issy les Moulineaux (FR); Anil Kumar Goel, Waterloo (CA); Colin Florendo, Marlborough, MA (US); Rolando Blanco, Waterloo (CA); David Edward DeHaan, Waterloo (CA)

(72) Inventors: Mihnea Andrei, Issy les Moulineaux (FR); Anil Kumar Goel, Waterloo (CA); Colin Florendo, Marlborough, MA (US); Rolando Blanco, Waterloo (CA); David Edward DeHaan, Waterloo (CA)

(73) Assignee: Sybase, Inc., Dublin, CA (US)

( * ) Notice: Subject to any disclaimer, the term of this patent is extended or adjusted under 35 U.S.C. 154(b) by 472 days.

(21) Appl. No.: 14/136,724

(22) Filed: Dec. 20, 2013

(65) Prior Publication Data

US 2015/0178329 A1    Jun. 25, 2015

(51) Int. Cl.
*G06F 7/00* (2006.01)
*G06F 17/00* (2006.01)
(Continued)

(52) U.S. Cl.
CPC .... *G06F 17/30362* (2013.01); *G06F 11/1448* (2013.01); *G06F 17/30309* (2013.01);
(Continued)

(58) Field of Classification Search
CPC ......... G06F 17/30362; G06F 17/30309; G06F 17/30312
(Continued)

(56) References Cited

U.S. PATENT DOCUMENTS 5,280,612 A    1/1994 Lorie et al.
5,287,496 A    2/1994 Chen et al.
(Continued)

FOREIGN PATENT DOCUMENTS

EP    2660735 A1    6/2013
EP    2660736 A1    6/2013

*Primary Examiner* — Kris Mackes
*Assistant Examiner* — Lin Lin Htay
(74) *Attorney, Agent, or Firm* — Sterne, Kessler, Goldstein & Fox P.L.L.C.

(57) ABSTRACT

A delta store giving row-level versioning semantics to a non-row-level versioning underlying store is described. An example method includes establishing a column-based in-memory database including a main store and a delta store, where the main store allows only non-concurrent transactions on a same table and the delta store has a plurality of row-visibility bitmaps implementing a row-level versioning mechanism that allows concurrent transactions on the same table. A local RID space is established for a table fragment, that for each table in the database, the data of the table is stored in one or more main table fragment in the main store and in one or more delta table fragments in the delta store. Each table fragment has a local RID space, and the local RID space is a collection of one-based contiguous integer local RIDs (Row IDs) describing local positions of the rows of the table fragment.

22 Claims, 17 Drawing Sheets

(51) Int. Cl.
  *G06F 17/30* (2006.01)
  *G06F 11/14* (2006.01)
(52) U.S. Cl.
  CPC .. *G06F 17/30368* (2013.01); *G06F 17/30371*
    (2013.01); *G06F 17/30312* (2013.01); *G06F*
    *17/30315* (2013.01); *G06F 17/30339*
    (2013.01); *G06F 2201/80* (2013.01); *G06F*
    *2201/825* (2013.01); *G06F 2201/84* (2013.01);
    *G06F 2201/87* (2013.01)
(58) Field of Classification Search
  USPC ........................................................ 707/609
  See application file for complete search history.

(56) References Cited

U.S. PATENT DOCUMENTS

| | | | |
|---|---|---|---|
| 6,374,263 | B1 | 4/2002 | Bunger et al. |
| 8,266,111 | B2 | 9/2012 | Lin et al. |
| 8,356,007 | B2 | 1/2013 | Larson et al. |
| 8,504,542 | B2 | 8/2013 | Chang et al. |
| 8,601,038 | B2 | 12/2013 | Plattner et al. |
| 8,607,238 | B2 | 12/2013 | Nagpal et al. |
| 2004/0225996 | A1* | 11/2004 | Venkatesan ............... G06F 8/68 717/100 |
| 2007/0174358 | A1* | 7/2007 | He ..................... G06F 17/30309 |
| 2008/0228697 | A1* | 9/2008 | Adya ................ G06F 17/30607 |
| 2008/0294676 | A1* | 11/2008 | Faerber .................... H03M 7/30 |
| 2010/0235335 | A1* | 9/2010 | Heman ............. G06F 17/30345 707/703 |
| 2011/0010330 | A1 | 1/2011 | McCline et al. |
| 2011/0295817 | A1* | 12/2011 | Chandrasekar ......... H03M 7/30 707/693 |
| 2012/0011106 | A1 | 1/2012 | Reid et al. |
| 2012/0136839 | A1 | 5/2012 | Eberlein et al. |
| 2012/0166690 | A1* | 6/2012 | Regula ................. G06F 13/404 710/104 |
| 2012/0221528 | A1* | 8/2012 | Renkes ............. G06F 17/30315 707/674 |
| 2013/0036089 | A1* | 2/2013 | Lucas ............... G06F 17/30283 707/615 |
| 2013/0117307 | A1 | 5/2013 | Vishnoi et al. |
| 2013/0318058 | A1 | 11/2013 | Fries et al. |
| 2014/0136473 | A1* | 5/2014 | Faerber ............. G06F 17/30315 707/607 |
| 2015/0039559 | A1* | 2/2015 | Bhattacharjee ... G06F 17/30356 707/625 |

* cited by examiner

300

310 — Establishing a column-based in-memory database including a main store and a delta store, wherein the main store implements table-level versioning mechanism that does not allow concurrent transactions on a same table and the delta store has a plurality of row-visibility bitmaps implementing a row-level versioning mechanism that allows concurrent transactions on the same table 320 — Establishing a local RID space for a table fragment, wherein for each table in the database, the data of the table is stored in one or more main table fragment in the main store and in one or more delta table fragments in the delta store, wherein each table fragment has a local RID space, and wherein the local RID space is a collection of one-based contiguous integer local RIDs (Row IDs) describing local positions of the rows of the table fragment 330 — Establishing a global RID space for a table version, wherein the table has a plurality of table versions represented by the bitmaps, the table version providing transaction-consistent snapshots of the table visible to transactions according to transactional snapshot isolation rules in a plurality of global RID spaces, and wherein each global RID space contains an ordered sequence of table fragments, one main table fragment followed by the one or more delta table fragments, each with its local RID space, and wherein a last delta fragment in a global RID space is a current delta fragment, and wherein a global RID space is a collection of one-based global RIDs (Row IDs) describing global positions of the rows of the table version in its underlying ordered sequence of the main table fragments and the one or more delta table fragments, and wherein a most recently created global RID space is a current global RID space

FIG. 3

MULTIPLE RID SPACES IN A DELTA-STORE-BASED DATABASE TO SUPPORT LONG RUNNING TRANSACTIONS

CROSS-REFERENCE TO RELATED APPLICATION

This application is related to Non-Provisional application Ser. No. 13/960,335, filed Aug. 6, 2013, entitled "DELTA STORE GIVING ROW-LEVEL VERSIONING SEMANTICS TO A NON-ROW-LEVEL VERSIONING UNDERLYING STORE," which is incorporated by reference herein in its entirety.

BACKGROUND

With the development in modern computer architecture, fast communication among multi-core processors Makes parallel processing possible. Because large main memory configurations are available and affordable, server settings with hundreds of cores and terabytes of main memory become a reality.

High performance database systems, such as in-memory databases, are adaptive to make full usage of the main memory provided by modern hardware. In such systems, all relevant data may be kept in main memory, so that read operations can be executed without disk I/O. The systems may be designed to minimize the number of CPU cache misses and to avoid CPU stalls due to memory access. One approach for achieving this goal is using column-based storage in memory, which leads to high spatial locality of data and instructions, so the operations can be executed completely in the CPU cache without costly random memory accesses.

In a column-based storage, the entries of a column are stored in contiguous memory locations. Columnar data storage allows highly efficient compression, such that the relevant data can be stored in main memory with less cost using data compression. The data structure that contains the main part of the data is called the main storage. The changes are taken over from the delta storage asynchronously at some later point in time. The separation into main and delta storage allows high compression and high write performance at the same time. The column store may implement MVCC (Multi Version Concurrent Control), which is based on having multiple versions of the same data in the database. When reading data it ensures that the operation reads the right set of versions required to get a correct and consistent view of the database. A Consistent View Manager may determine which version of the database that each operation is allowed to see depending on the current transaction isolation level.

As data changes are accumulated in the delta storage, the main storage is merged with the delta storage asynchronously in the background. In conventional systems, given that merges are computationally expensive and time consuming, they negatively impact performance of ongoing transactions and statements running in the foreground. The effect of merges is exacerbated on long running transactions, which may be blocked for a prolonged period of time or terminated prematurely. As a result, such systems do not process internal merging operations with high concurrency and performance throughput from the perspective of external transactions. Therefore, conventional systems fail to provide an ideal mechanism to handle merging operations with optimal performance, concurrency and transparency.

BRIEF DESCRIPTION OF THE DRAWINGS/FIGURES

Embodiments are described, by way of example only, with reference to the accompanying drawings. In the drawings, like reference numbers generally indicate identical or functionally similar elements. The drawing in which an element first appears is typically indicated by the leftmost digit or digits in the corresponding reference number.

FIG. 3 is a flowchart for a method for using multiple RID spaces in a delta-store-based database to support long-running transactions, according to an embodiment.

DETAILED DESCRIPTION

Provided herein are system, method and/or computer program product embodiments, and/or combinations and sub-combinations thereof, for providing multiple RID spaces in a delta-store-based database to support long running transactions. As will be described in further detail below, embodiments can implement a local RID (Row ID) space for a table fragment, which contains a collection of local RIDs describing location positions of rows. Embodiments further provide a global RID space for a table version, that contains a collection of global Rips describing global positions of the rows of the table Version in an underlying ordered sequence of a main table fragment and one or more delta table fragments. A new delta table fragment is generated upon the start of the merge of a main store with a delta store. A new RID space is generated upon the completion of the merge. Accordingly, embodiments enable a delta-stored based database to handle the merge in the background without blocking the transactions in the foreground.

System

Figure 1:
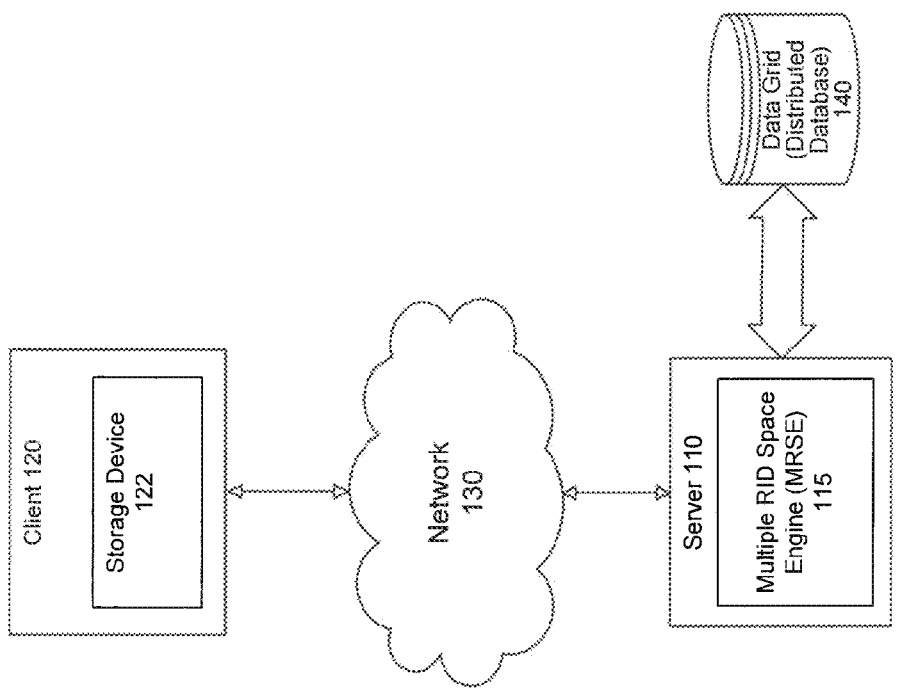
FIG. 1 illustrates a client/server system, according to an embodiment.

FIG. 1 illustrates a client/server system 100. System 100 includes a server 110, a Row-Level Versioning Engine (RLVE) 115, a client 120, a network 130, and a database 140.

Client 120 communicates with server 110 over the network 130. Specifically, client 120 may be connected to a Database Management System (DBMS) (not shown) on server 110 via network 130. In an embodiment, the DBMS includes Sybase® IQ (available from Sybase, Inc. of Dublin, Calif.) and operates as an independent process (i.e., independently of the clients), running under a server operating system such as Microsoft® Windows NT, Windows 2000. Windows XP, Windows Vista and Windows 7 (all from Microsoft Corporation of Redmond, Wash.), UNIX (Novell), Solaris (Sun), or Linux (Red Hat). The network 130 includes functionality for packaging client calls in the well-known Structured Query Language (SQL) together with any parameter information into a format (of one or more packets) suitable for transmission to the DBMS. Client 120 may send SQL statement to server 110 and receive query result from server 110. Although only one server 110 is shown, more servers may be used as necessary. Network 130 may be any network or combination of wired and wireless networks that carry data communication. Such network can include, but is not limited to, a local area network, medium area network, and/or wide area network such as the Internet.

Client 120 includes a storage device 122. Although only one client 120 is shown, more clients may be used as necessary. Storage device 122, an example of which will be described in detail with respect to FIG. 17, can be any device for recording and storing information, which includes but is not limited to, flash memory, magnetic tape and optical discs.

Server 110 can host Multiple RID Space Engine (MRSE) 115. As illustrated in FIG. 1, client 120 can send data requests to server 110, which can in turn invoke MRSE 115 for further processing, MRSE 115 can be software, firmware, or hardware or any combination thereof in a computing device. System 100 can be implemented on or implemented by one or more computing devices. As will be further described with respect to FIG. 17, a computing device can be any type of computing device having one or more processors. For example, a computing device can be a computer, server, workstation, mobile device (e.g., a mobile phone, personal digital assistant, navigation device, tablet, laptop or any other user carried device), game console, set-top box, embedded system or other device having at least one processor and memory. A computing device may include a communication port or I/O device for communicating over wired or wireless communication link(s).

Figure 2:
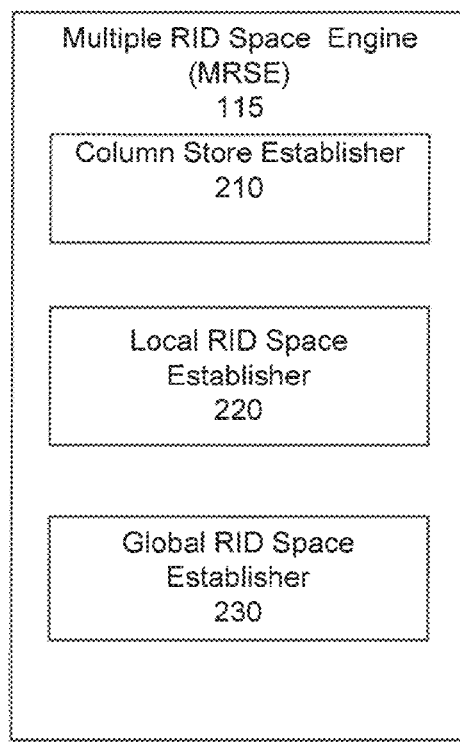
FIG. 2 illustrates elements of a Multiple RID Spaces Engine (MRSE), according to an embodiment.

FIG. 2 illustrates elements of a Multiple RID Space Engine (MRSE), according to an embodiment. In the example shown in FIG. 2, MRSE 115 includes column store establisher 210, local RID space generator 220, and optionally, global RID space generator.

Column store establisher 210 establishes a column-based in-memory database including a main store, and a delta store. In one embodiment, the main store allows non-concurrent transactions on a same table, while the delta store implements a row-level versioning mechanism that allows concurrent transactions on the same table. The delta store may include one or more bitmaps, which correspond to one or more versions of the table that provide consistent views to transactions that start at various points of time. Alternatively, the bitmaps may be located outside of the delta store, but managed by the delta store.

Local RID space establisher 220 establishes a local RID space for a table fragment. In an embodiment, for each table in the database, the data of the table is stored in one or more main table fragment in the main store and in one or more delta table fragments in the delta store. In another embodiment, each table fragment has a local RID space, and the local RID space is a collection of one-based contiguous integer local RIDs (Row IDs) describing local positions of the rows of the table fragment.

Global RID space establisher 230 establishes a global RID space for a table version. In an embodiment, the table has a plurality of table versions represented by the bitmaps and the table version provides transaction consistent snapshots of the table visible to transactions according to transactional snapshot isolation rules in a plurality of global RID spaces. In another embodiment, each global RID space contains an ordered sequence of table fragments, one main table fragment followed by the one or more delta table fragments, each with its local RID space. In still another embodiment, a global RID space is a one-based collection of integer global RIDs (Row IDs) describing global positions of the rows of the table version in its underlying ordered sequence of the main table fragments and the one or more delta table fragments. In still another embodiment, a last delta fragment in a global RID space is a current delta fragment and a most recently created global RID space is a current global RID space.

In some embodiments, MRSE 115 further includes a transaction processor, configured to process a transaction that generates data changes in a table of the column-based in-memory database, through insert, update or delete statements of the transaction. In an embodiment, upon a start of the transaction, the transaction is attached to the current global RID space of each table that the transaction accesses and processes, until completion of processing, within the current global RID space attached by the transaction. In another embodiment, all new rows and new row versions created by the insert and the update statements are physically inserted in the current delta table fragment and marked as valid using global RID bitmaps, and all old rows and old row versions destroyed by the delete or update statements are logically marked as invalid using the global RID bitmaps. In still another embodiment, the global RID bitmaps of each table modified by the transaction correspond to the global RID space associated with the table and the transaction.

Embodiments of the elements of MRSE 115 in FIG. 2, as described herein, may be further configured to run in parallel. Such parallel execution of these elements would increase the efficiency and speed of MRSE 115.

Method

FIG. 3 is a flowchart for a method for using multiple RID spaces in a delta-store-based database to support long-running transactions, according to an embodiment. For ease of explanation, method 300 will be described with respect to MRSE 115 of FIG. 2, as described above. However, method 300 is not intended to be limited thereto.

At stage 310, a column-based in-memory database including a main store and a delta store is established. In an embodiment, the main store allows non-concurrent transactions on a same table and the delta store has a plurality of row-visibility bitmaps implementing a row-level versioning mechanism that allows concurrent transactions on the same table. For example, column store establisher 210 may establish the main store and the delta store. In another embodiment, a table in the column-based in-memory database may be represented by two portions: a main store portion and a delta store portion. In still another embodiment, the row-visibility bitmaps constitute different versions of the table visible various points in time to an internal transaction as well external transaction. Each bitmap may include a main store section, which covers the RID range of the table rows located in the main store, and a delta store section, which covers the RID range of the table rows located in the delta store.

At stage 320, a local RID space for a table fragment is established. In an embodiment, for each table in the database, the data of the table is stored in one or more main table fragment in the main store and in one or more delta table fragments in the delta store. In another embodiment, each table fragment has a local RID space, and the local RID space is a collection of one-based contiguous integer local RIDs (Row IDs) describing local positions of the rows of the table fragment.

At stage 330, a global RID space is established for a table version. In an embodiment, the table has a plurality of table versions represented by the bitmaps and the table version provides transaction-consistent snapshots of the table visible to the transactions according to transactional snapshot isolation rules in a plurality of global RID spaces. In another embodiment, each global Rh) space contains an ordered sequence of table fragments, one main table fragment followed by the one or more delta table fragments, each with its local RID space, and a last delta fragment in a global RID space is a current delta fragment. In still another embodiment, a global RID space is a one-based collection of integer global RIDs (Row IDs) describing global positions of the rows of the table version in its underlying ordered sequence of the main table fragments and the one or more delta table fragments, and a most recently created global RID space is a current global RID space.

The method for using multiple RID spaces in a delta-store-based database to support long-running transactions may include the following optional steps.

In an embodiment, a transaction is processed that the transaction generates data changes in a table of the column-based in-memory database, through insert, update or delete statements of the transaction. In another embodiment, upon a start of the transaction, the transaction is attached to the current global RID space of each table that the transaction accesses and processes, until completion of processing, within the global RID space attached by the transaction. In another embodiment, all new rows and new row versions created by the insert and the update statements are physically inserted in the current delta table fragment and marked as valid using global RID bitmaps, and all old rows and old row versions destroyed by the delete or update statements are logically marked as invalid using the global RID bitmaps. In still another embodiment, the global RID bitmaps of each table are modified by the transaction correspond to the global RID space associated with the table and the transaction.

In an embodiment, for each table, the delta store is periodically merged to the main store, and the delta store accumulates the data changes and each merge generates a new global RID space.

In an embodiment, the merging occurs concurrently with the processing of the transaction, while not blocking the transaction, and the delta table fragment and the main table fragment which were current before the merge become merged table fragments. In another embodiment, the merge creates a new delta table fragment and a new main table fragment, which become new current table fragments after completion of the merge.

In an embodiment, a new delta table fragment is generated at beginning of the merge, and the new delta table fragment becomes the current delta table fragment. In another embodiment, from a point after the beginning of the merge, all new rows and row versions created by the insert and update statements are inserted into the new delta table fragment. In still another embodiment, all RID spaces which exist at the beginning of the merge, including the current RID space, are extended by appending the new delta table fragment at an end of the ordered sequence of table fragments. In still another embodiment, all transactions which are open at the beginning of the merge continue processing of the table within the extended RID space where the transactions were originally attached. In still another embodiment, all new transactions which begin after the beginning of the merge and before the completion of the merge are attached for the table within an extended current RID space.

In an embodiment, the new main table fragment is generated at the completion of the merge. In another embodiment, rows from the merged delta fragment, which are inserted and committed and not deleted or whose deletion is not yet committed, are transferred in the new main table fragment. In still another embodiment, rows from the merged main fragment, which are not yet deleted or whose deletion is not yet committed, are transferred to the new main table fragment. In still another embodiment, rows from the merged delta fragment, which are inserted and not yet committed, are transferred to the new current delta fragment.

In an embodiment, the new main table fragment is converted to the current main table fragment at the completion of the merge. In another embodiment, a new RID space is generated, which contains two table fragments in an order of the current main table fragment and the current delta table fragment, and the new RID space becomes the current RID space. In still another embodiment, a mapping is generated from a previous global RID space to the current global RID space for all rows moved from the table fragments of the previous RID space to table fragments of the current RID space. In still another embodiment, all transactions which are open at the completion of the merge continue processing of the table within RID spaces attached by the transactions. In still another embodiment, all new transactions which begin after the completion of the merge and before a beginning of a next merge, are attached for the table to the current RID space.

In an embodiment, a new version for each table modified by the transaction is created, upon successful completion of the transaction, and each of the new versions is created in the current global RID space of the table. In another embodiment, global RID bitmaps—representing inserted and deleted rows and row versions, and during the processing of the transaction, corresponding to a previous RID space attached to the table within the transaction—are translated to the current RID space, if the current RID space is different from the previous RID space attached to the table within the transaction.

In an embodiment, each global RID space is maintained as long as either the global RID space is current or an active transaction is attached to the global RID space. In another embodiment, each table fragment is maintained as long as an existing global RID space contains the table fragment.

The details of stages 310-30 for using multiple RID spaces in a delta-based database to support long running transactions will be further illustrated in FIGS. 4-16 below.

Figure 4:
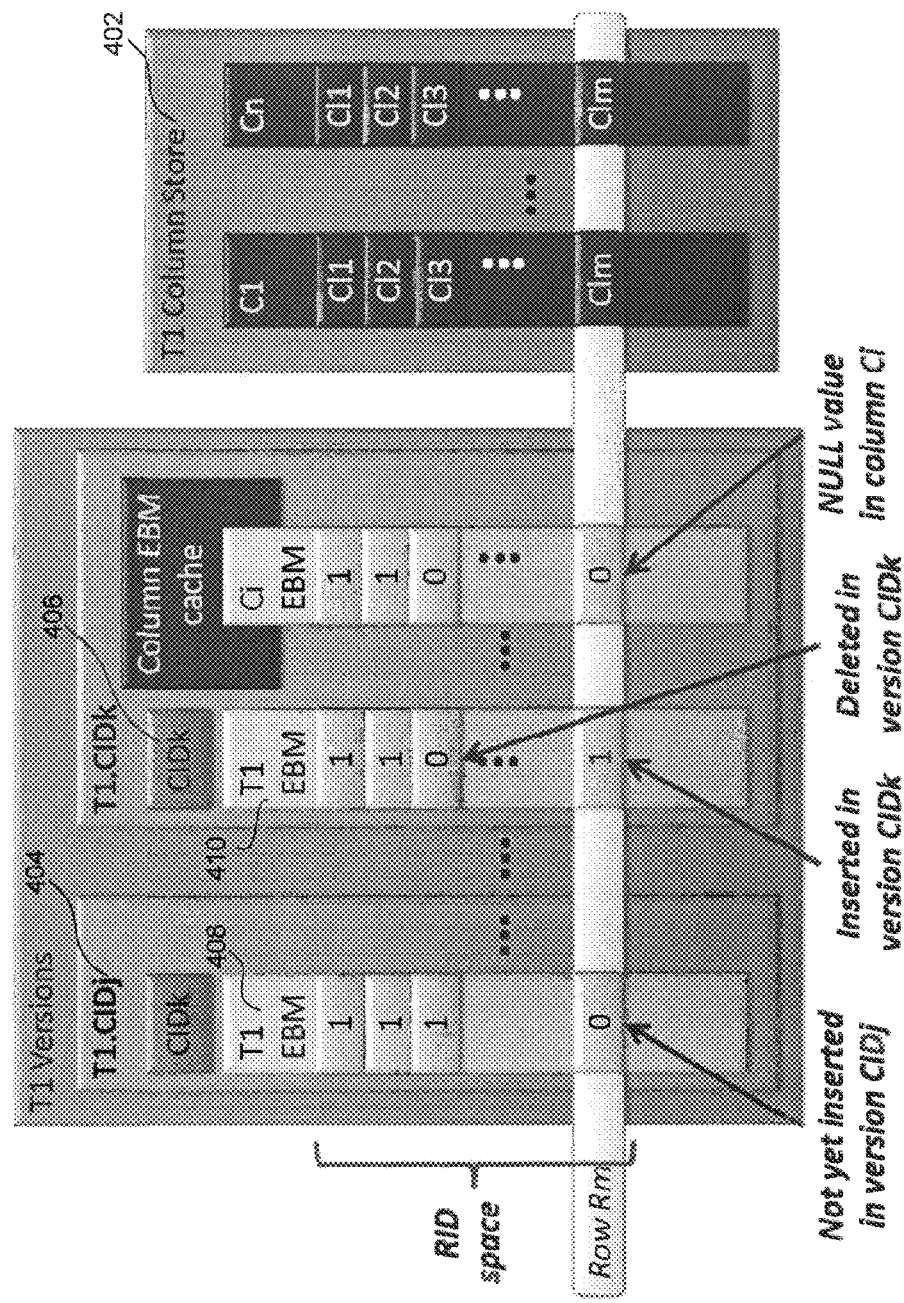
FIG. 4 depicts a plurality of RID spaces, according to an embodiment.

FIG. 4 depicts a plurality of RID spaces, according to an embodiment. In the example illustrated in FIG. 4, table T1 with columns C1 to Cn resides in column store 402. Table T1 may have different versions T1.CIDj to T1.CIDk visible to transaction at various points in time. For example, T1 version T1.CIDj 404 is represented by bitmap T1 EBM (Existence BitMap) 408 and T1 version T1.CIDk is represented by bitmap T1 EBM 410.

Although FIG. 4 only illustrates two versions of table T1, multiple tables may reside in column store 402 and multiple bitmaps may represent multiple tables and their versions. Each bitmap or aggregation of bitmaps may provide a transaction-consistent snapshot or version of the table visible to a transaction.

Bitmap T1 EBM 408 contains a set of rows, and each row is associated with a unique Row ID (RID) representing the physical position of the row. A collection of RIDs constitute a local RID space that the table fragment references. A local RID space is an attribute of a table fragment. Likewise, a global RID space refers to a specific subset of all existing table fragments (one main fragment and one or several delta fragments) and defines an ordering on them (first the main fragment, followed in a given order by the delta fragments). A global RID space is an attribute that a table version as represented by the bitmaps—references. An entry "0" in the bitmap, may indicate that a row has yet to be inserted or a row has been deleted in the table version. Likewise, an entry "1" may indicate a row has inserted into the table version.

Figure 5:
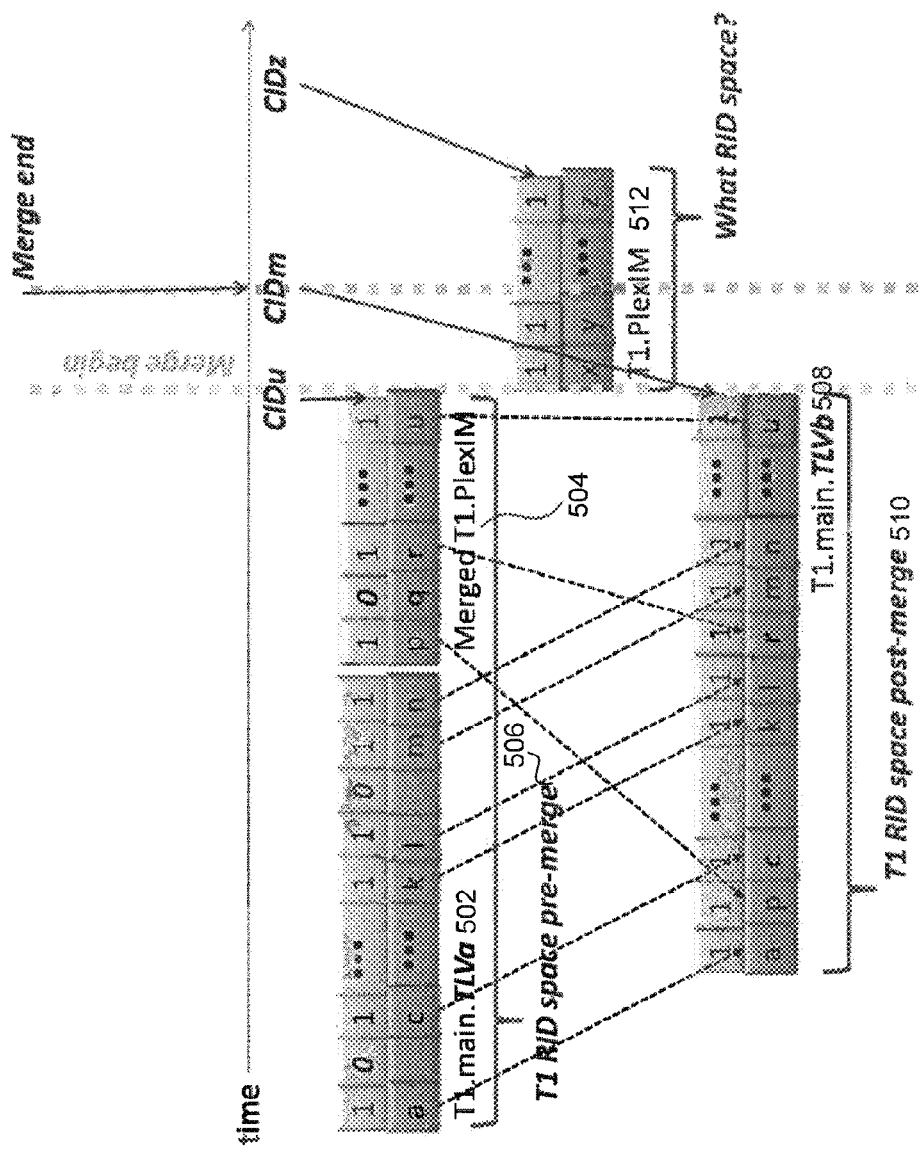
FIG. 5 illustrates generation of a RID space by the merge, according to an embodiment.

FIG. 5 illustrates the generation of a RID space by the merge, according to an embodiment. In the example of FIG. 5, at the beginning of the merge, main store T1.main.TVLa 502 and delta store Merged T1.PlexIM 504 are being merged with each other, where T1.main.TVLa 502 and Merged T1.PlexIM 504 reference old RID space—T1 RID space pre-merge 506. After the merge starts, a new delta store T1.PlexIM 512 is generated to record data changes incurred by the transactions. As a result of the merge, a new main store T1.main.ThVb 508 is generated in new RID space—T1 RID space post-merge 510.

Because there may be transactions starting in the old RID space T1 RID space pre-merge 506 before the merge starts, the same long running transactions may span the period of time the merge occurs. Thus, the new delta store T1.PlexIM 512 may be used for tracking the data changes occurred for such long running transactions that started in the old RID space T1 RID space pre-merge 506 and new delta store T1.PlexIM 512 is in the old RID space T1 RID space pre-merge 506. Likewise, for transactions started after the completion of the merge in new RID space T1 RID space post-merge 510, the new delta T1.PlexIM 512 is also needed to track data changes caused by such transactions, and the new delta T1.PlexIM 512 is in the new RID space T1 RID space post-merge 510.

Furthermore, as indicated in FIG. 5, the RIDs are not preserved after the merge. For example, the row "k" may end up with a different position in the newly merged main store after merge. Indeed, rows in the delta store may spread around in the new main store after the merge. Therefore, multiple RID spaces generated before and after the merge may be needed to track the position of the rows in the table versions visible to various transactions at different points of time.

Figure 6:
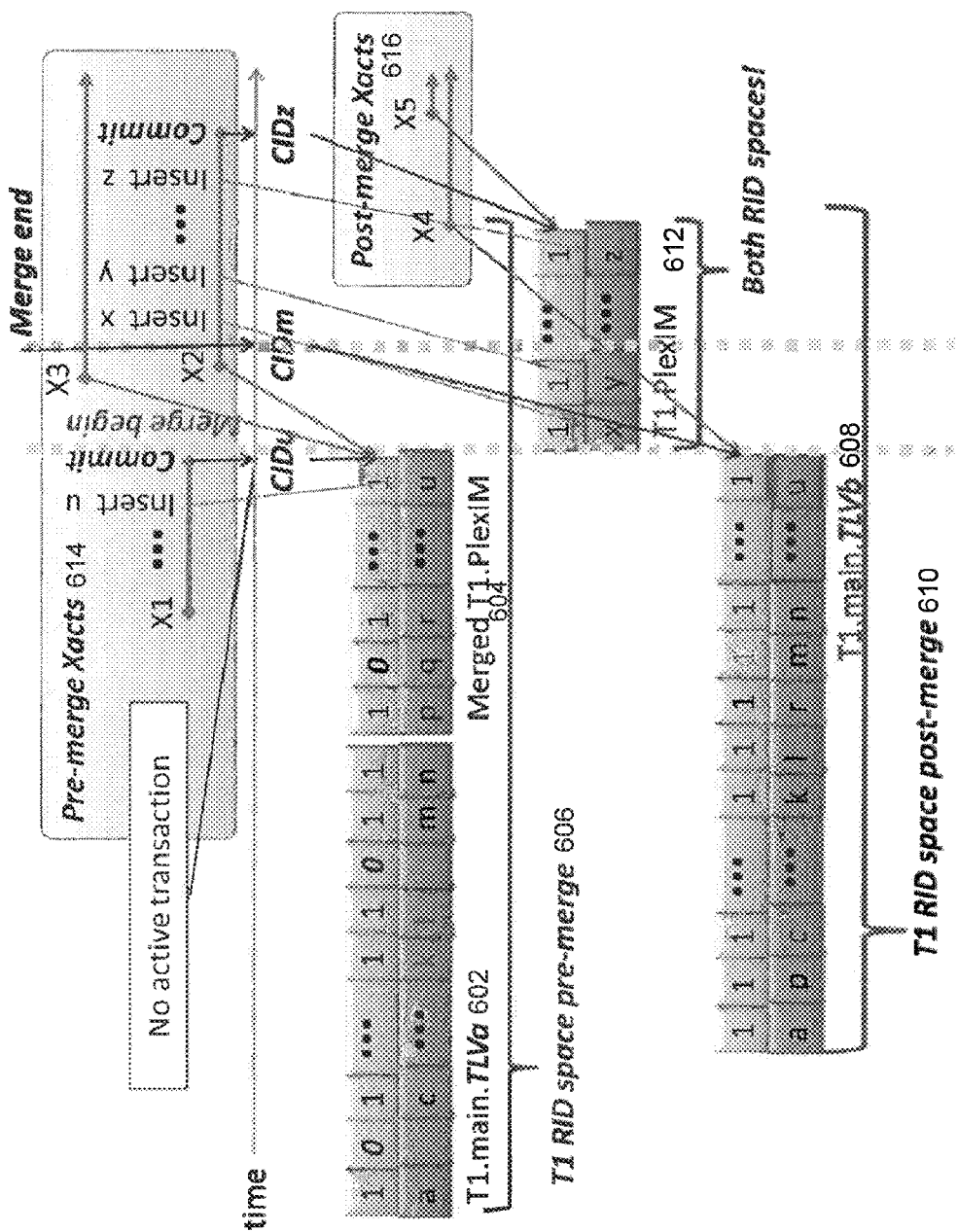
FIG. 6 illustrates the coexistence of multiple RID spaces, according to an embodiment.

FIG. 6 illustrates the coexistence of multiple RID spaces, according to an embodiment. In this example, similar to FIG. 5, the old RID space includes main store T1.main.TLVa 602, the old delta store Merged T1.PlexIM 604, and a new delta store T1.PlexIM 612, which accumulates the data changes after the merge starts. In an embodiment, the old RID space T1 RID space pre-merge 606 is kept as long as needed, because some old long running transaction may still use an older version of the table in the old RID space T1 RID space pre-merge 606. New RID space T1 RID space post-merge 610 co-exists with new RID space T1 RID space post-merge 610.

For example, transactions x2 and x3 start before the completion of the merge, and they need to see the old version of T1 in old RID space T1 RID space pre-merge. Transactions x4 and x5 start after the completion of the merge, and they need to see new version of T1 in new RID space T1 RID space post-merge 610. Notably, while transactions in each RID space record the data changes in new delta store T1.PlexIM 612, they see different main stores in different RID spaces. As a result, the same row in the table versions that transactions x2 and x4 operate on may have different RIDs, as x2 is in old RID space T1 RID space pre-merge 606 and x4 is in new RID space T1 RID space post-merge 610. Therefore, different transactions may see the same row in the table versions with different RIDs, depending on the RID space that the transaction is located in.

In an embodiment, an old RID space exists before the merge. In the example of FIG. 6, T1.main.TLVa 602 is merged with old delta Merged T1.PlexIM 604 and new delta store T1.PlexIM 612.

In another embodiment, a new space exists after the merge, such as T1.main.ThVb 608 and T1.PlexIM 612. However, the new delta store T1.PlexIM 612 may be seen by transactions in both Spaces. For example, different transactions see the same row in new delta store T1.PlexIM 612 with different RIDs, depending on the RID space that the transactions are located.

For transactions that start before the merge completed, they are pre-merge transactions that see the new table fragment 612 (or new delta store 612) in the old RID space T1, because they use old RID space T1 RID space pre-merge 606. Conversely, for post-merge transactions, which start after the merge completed, they see the new table fragment 612 in the new RID space T1 RID space post-merge 610. Accordingly, depending on the type of the transactions pre or post merge transactions, and when the transactions started, they either see the data changes generated by the transactions in the new or old RID space. In an embodiment, having a table fragment visible either in the old or new RID space—depending which transactions sees it—offers the solution that the merge is kept in the background, without intrusion or interference to foreground transactions.

In another embodiment, the start time of the transaction determines how many RID spaces need to be kept. However, the commit time of transactions determines the strategy on commit handling. For example, if the transactions commit before the merge ended (called twilight transactions), which insert some rows while the merge is active, and they commit before merge ended, only normal processing is needed and the transaction is handled in the old RID space. If the transactions commit after the merge completed, so a new RID space is created upon the completion of the merge. In this more complex scenario, the data changes generated by the inserted rows need be visible to the subsequent new transactions in the new RID space.

Figure 7:
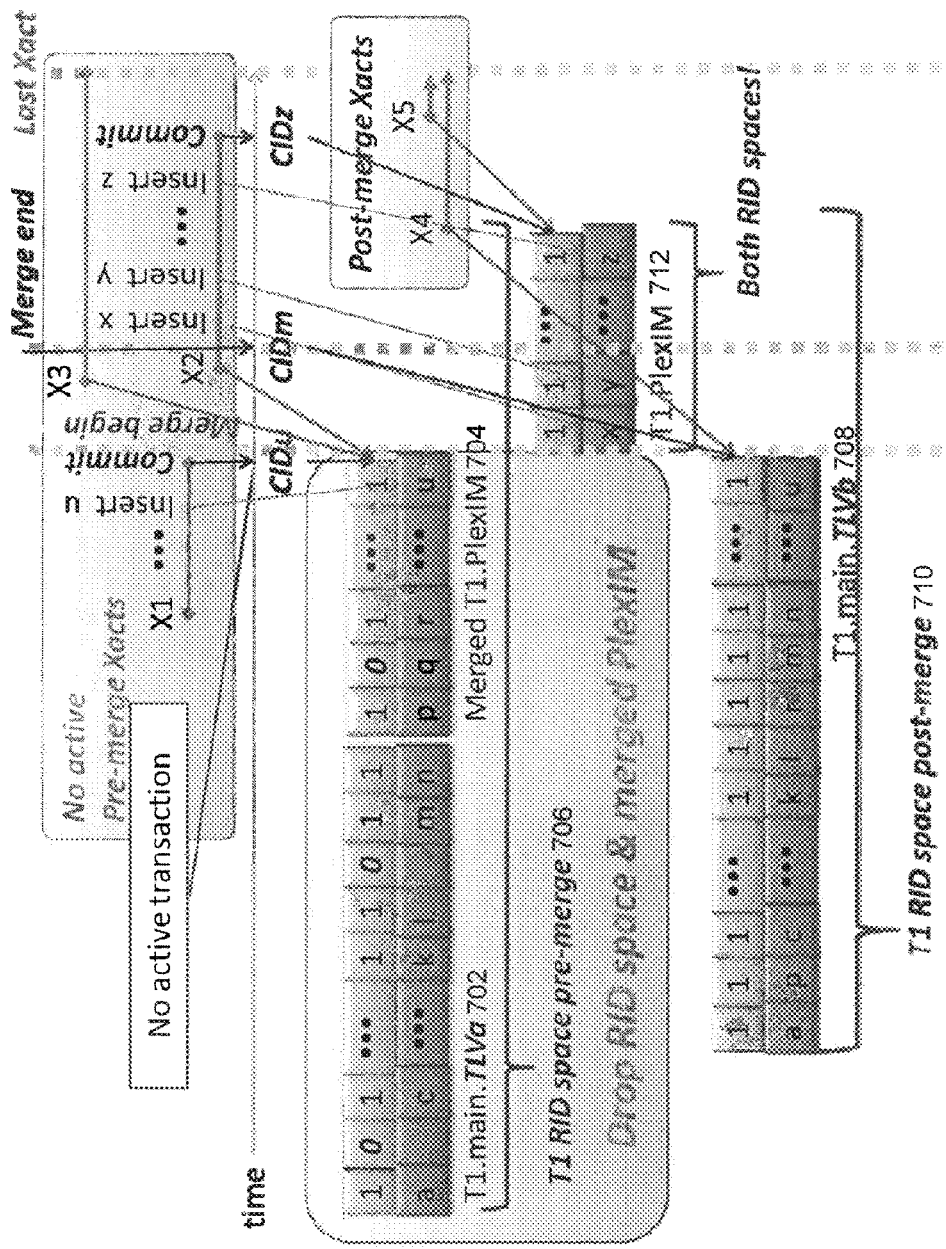
FIG. 7 depicts transactions across multiple RID spaces, according to an embodiment

FIG. 7 depicts transactions across multiple RID spaces, according to an embodiment. In this example, transaction x3 is the longest surviving transaction, which starts after beginning of the merge and references old RID space T1 RID space pre-merge 706. When transaction x3 completes (not shown), because old RID space T1 RID space pre-merge 706 is not referenced by any transaction, it can be dropped. At this point, both main store T1.main.TLVa 702 and old delta store Merged T1.PlexIM 704 can be garbage collected.

In one embodiment, a RID space is a logical entity that includes a collection of RIDs corresponding to rows in a table version represented by the bitmaps. Bitmaps in the RID space indicate the positions of the rows, which may contain gaps in between. When garbage collection occurs, bitmap can be garbage collected as well. RID spaces may have objects attached to them, which hold the data visible in the RID spaces. As depicted in FIG. 7, as old main store T1.main.TLNa 702 is visible in the old RID space, when old RID space T1 RID space pre-merge 706 is dropped, the old version of main store T1.main.TLNa 702 can be dropped too. In this example, old delta store Merged T1.PleIM 704 can also be dropped. However, because new delta store T1.PlexIM 712 is part of both old RID space T1 RID space pre-merge 706 and part of new RID space T1 RID space post-merge 710, new delta store T1.PlexIM 712 cannot be dropped when the old RID space T1 RID space pre-merge 706 is garbage collected. In an embodiment, when a RID space is pinning, it precludes the destruction of the different table fragments in the delta stores that reference the RID spaces. When a table fragment in the delta store is not pinned by any RID space because the RID is destroyed, the table fragment can be destroyed too.

In one embodiment, a transaction always starts in a current RID space. For example, transactions x4 and x5 are post-merge transactions which start in new RID space T1 RID space post-merge 710. In contrast, transactions x2 and x3 are part of old RID space T1 RID space pre-merge 706. A merge operation may take time, and at the end of the merge, a new main store is created.

As illustrated in FIG. 7, upon the completion of the merge, transaction x2 inserts rows x, y and z in the new table fragment 712 and commits. Upon the commit of x2, because x4 starts before x2 commits, x4 will not see these rows x-z. In contrast, because x5 starts after x2 commits, x5 needs to see rows x-z. Thus, when an insertion of rows commits, the corresponding rows need to be visible in both old and new RID spaces, In an embodiment, the old RID space need to be alive as long as a transaction is open that began before the merge ended, as this transaction is using the old RID space. In this example, transaction x3 is the last transaction that uses the old RID space 706. At some point, x3 completes and no other transaction is using old RID space. Only then the old RID space can be dropped. Therefore, the old delta store Merged T1.PlexIM 704 can be dropped with the old RID space, because after this point, all data changes are captured in new version of main store and the new delta store.

Figure 8:
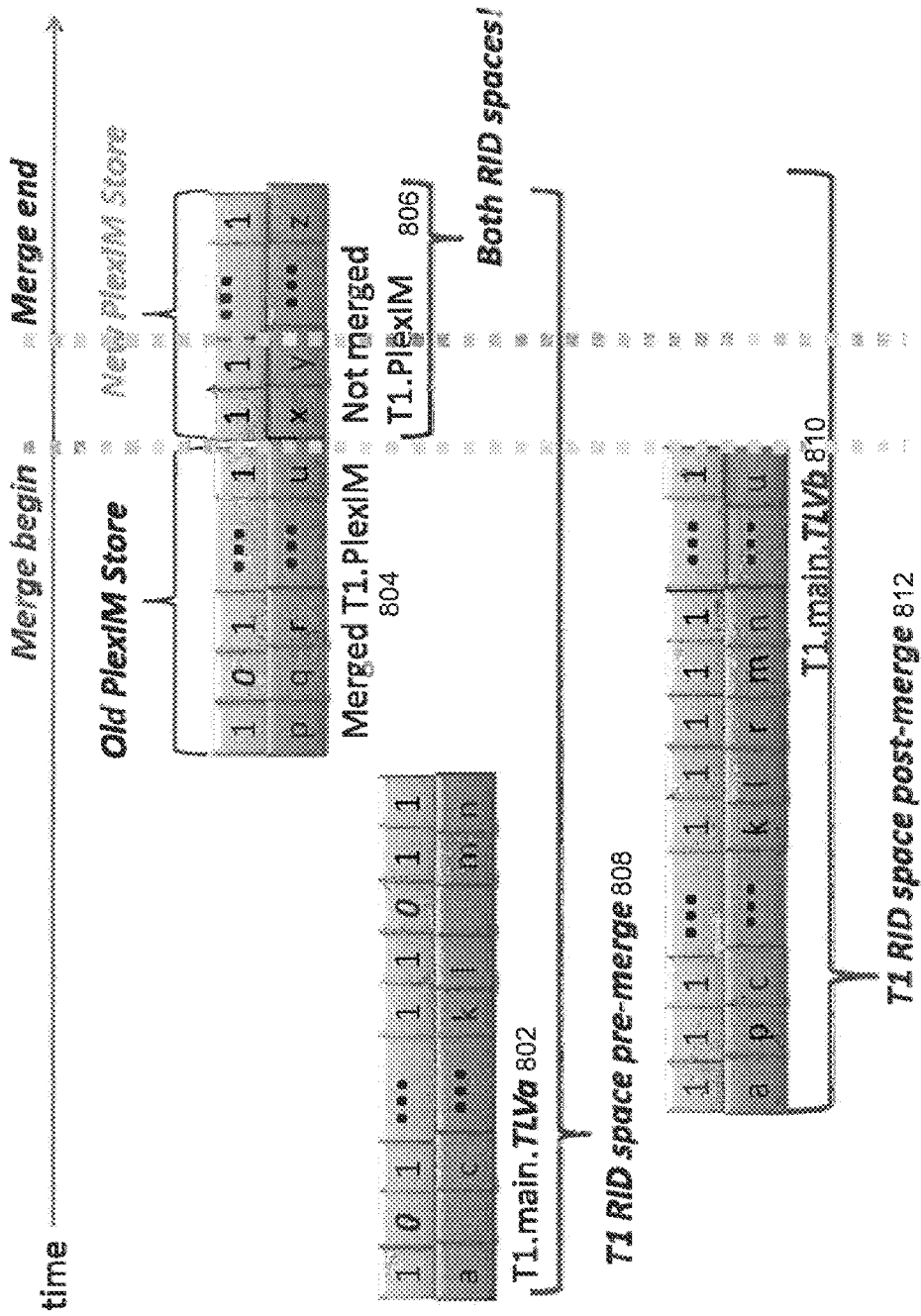
FIG. 8 depicts delta stores in multiple RID spaces, according to an embodiment.

FIG. 8 depicts delta stores in multiple RID spaces, according to an embodiment. In the example illustrated in FIG. 8, there is an old delta store Merged T1.PlexIM 804 in old RID space T1 RID space pre-merge 808. The new delta store—Not Merged T1.PlexIM 806—is created upon the beginning of the merge and continue to exist in two RID spaces—old RID space T1 RID space pre-merge 808 and new RID space T1 RID space post-merge 810. However, from the perspective of different transactions, they see the rows with different RIDs, or logical addresses in different RID spaces.

For example, old main store T1.main.TLVa may have RIDs ranging from 1-14. Old delta store Merged T.PlexIM 804 may start with RID range of 1 million, with RID of "p" at the first offset 1 million. As merge begins, a new delta store—Not merged T1.PlexIM 806 is created, with RID of "x" starting at the second offset 2 million. Accordingly, for any transactions start before the merge, they are in the old RID space and see the RIP of "x" as 2 million. For any transactions that start after the merge, they get into the new RID space and see the RID of "x" as 1 million. Therefore, in the illustration noted above, the same row may have different logical addresses or RIDs from the perspective of different transactions in different RID spaces. These row ID numbers are enumerated for illustration not for limitation purpose, and other offset values may be applicable.

Figure 9:
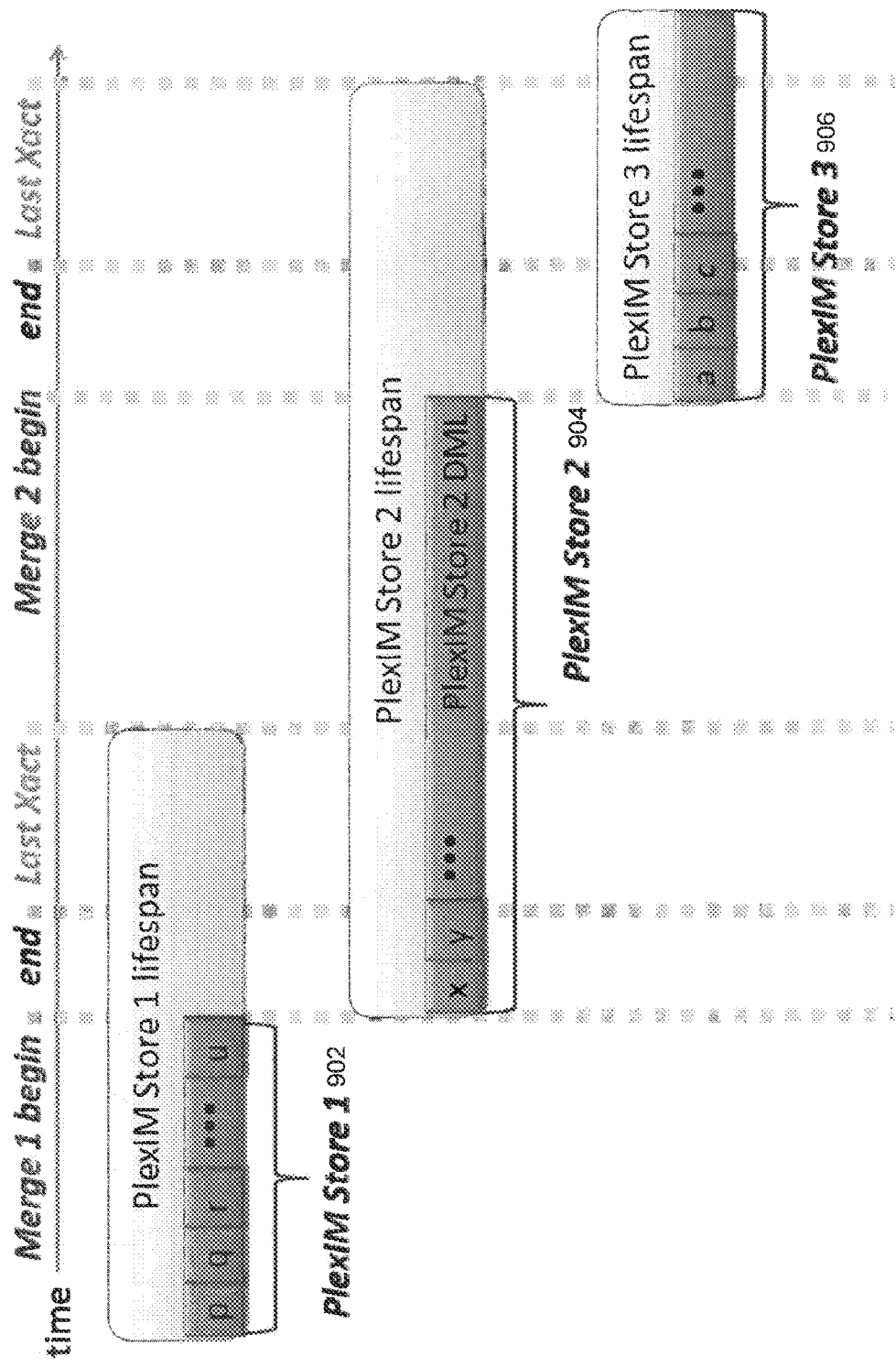
FIG. 9 illustrates the lifecycle of delta stores, according to an embodiment.

FIG. 9 illustrates the lifecycle of delta stores, according to an embodiment. In the example of FIG. 9, the life span of three delta stores PlexIM Stores 1-3 is shown during the occurrence of two merges. Upon the beginning of merge 1, delta store PlexIM Store 1 stops growing and PlexIM Store 2 is created. Likewise, at the start of merge 2, PlexIM Store 2 stops growing and PlexIM Store 3 is created. In one embodiment, the delta store cannot be discarded, until the last transaction referencing the delta store is terminated. For example, the lifespan of PlexIM store extends beyond the time point that it stops growing, until the last transaction referencing it is terminated.

Figure 10:
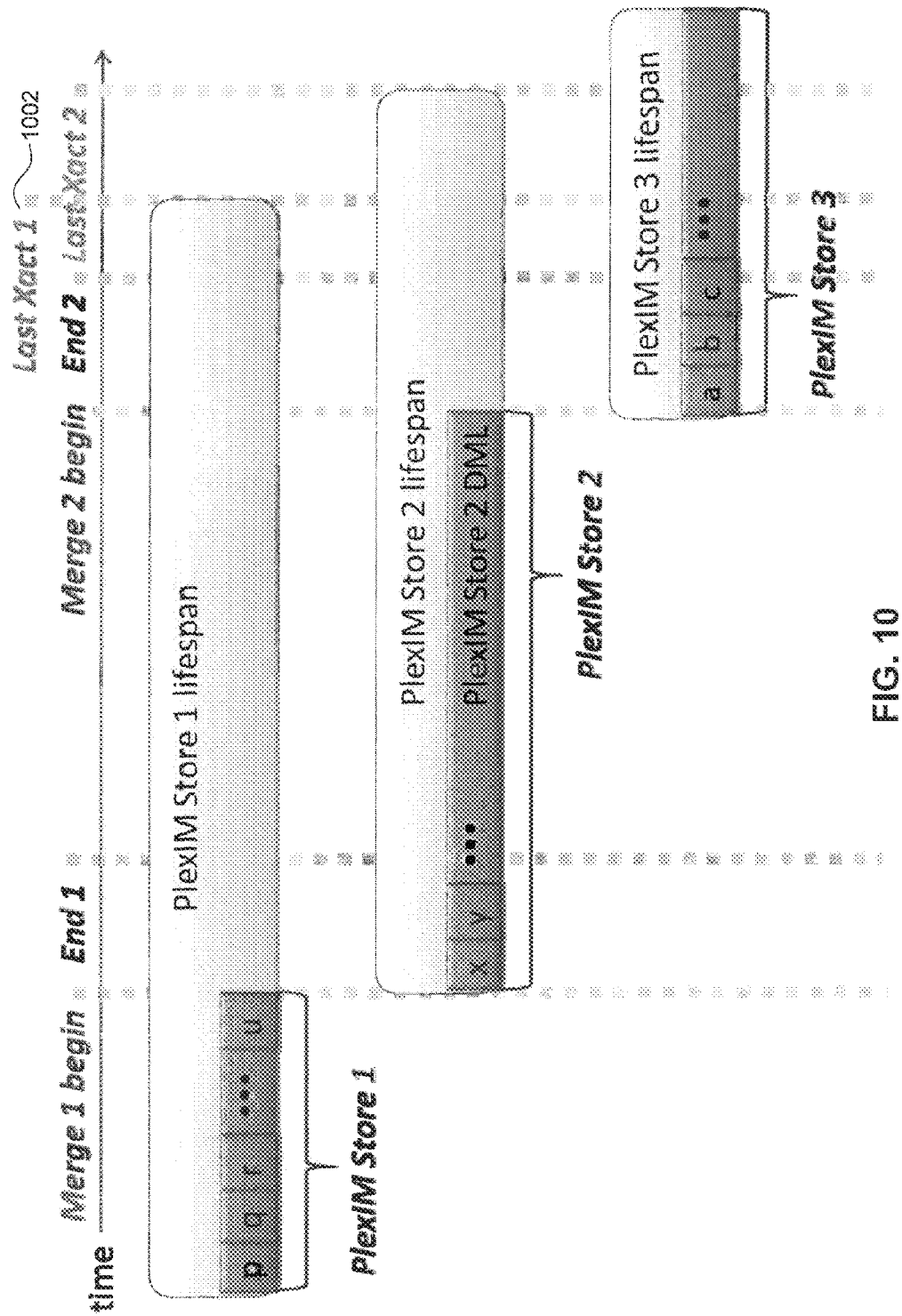
FIGS. 10-11 depict a long running transaction across RID spaces, according to an embodiment.
Figure 11:
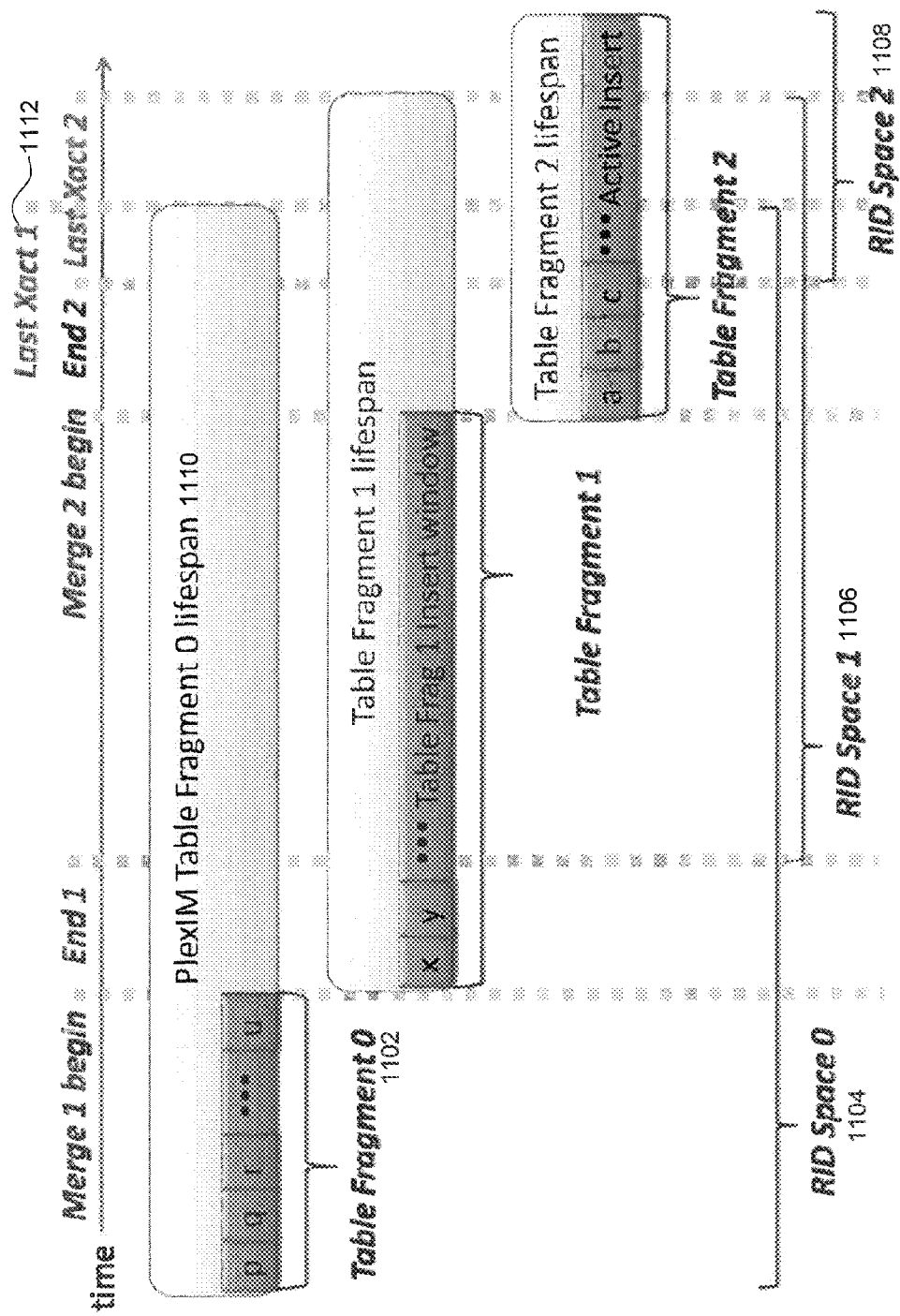

FIGS. 10-11 depict a long running transaction across RID spaces, according to an embodiment. In FIG. 10, for example, store 1 has long lifespan because transaction Xact 1 1002 which references PlexIM Store 1 is a long running transaction. In an embodiment, a transaction starts in the active latest RID space. As long as any active transaction is attached to the RID space, the RID space stays alive. For example, a RID space may have a counter to indicate how many active transactions are attached to it and may only be discarded after this counter is set to zero.

In FIG. 11, each of table fragment 0-2 corresponds to a delta store. Before the beginning of merge 1, all transactions insert data changes into table fragment 0; after merge 1 starts but before merge 2 begins, all transactions insert into table fragment 1.

In an embodiment, a table can have multiple rid spaces and multiple table fragments. A RID space may have a list of all fragments. Within a RID space, there are several bitmaps showing the versions of the table that are visible to the transactions. In another embodiment, a RID space may have a table fragment showing the main store, a table fragment showing the first delta store and a third table fragment showing the second delta store. For example, table fragment 0 1102 may be in RID space 0 1104 and RID space 1 1106 and RID space 2 1108, as the lifespan of table fragment 0 1102 extends into all three RID spaces.

In another embodiment, a long-running transaction may survive more than one merges, and accordingly need N RID spaces. FIG. 11 further shows the strategy to support more than two RID spaces. A PlexIM store may have N table fragments. In this example, the PlexIM store has three table fragments. Table fragment 0, which has rows p-u inserted, is part of table space 0 1104.

When merge 1 begins, it creates table fragment 1, and inserts rows x and y into table fragment 1. When merge 1 ends, table fragment 0 and RID space 0 1104 cannot be dropped, because there is still at least one transaction—namely Last Xact 1 112—that begins before merge 1 ended. PlexIM Table Fragment 0 Lifespan 1110 extends as long as some transaction begins before end 1 (the end of merge 1) and has not completed yet. Until the time that Last Xact 1 1112 is committed or aborted, the last transaction that starts before end 1, and references RID space 0, RID space 0 need to be alive and likewise table fragment 0 1102 need to survive, even after merge 1 ended.

At the end of merge 1 (indicated by End 1), table fragment 1 is created and rows x, y and etc. are inserted therein. Table fragment 1 continues to grow until merge 2 begins.

When merge 2 begins, table fragment 2 is created, an new rows, such as rows a, b, and c are inserted in table fragment 2. However, table fragment 1 needs to continue to live, because some transaction still reads RID space 1 1106. Table fragment 0 1112 also needs to survive because some transaction reads it too. In this example, there are three table fragments visible in RID spaces 0-1 to various transactions. When last Xact 1 completes, RID space 0 can be dropped; when last Xact 2 completes, RID space 1 can be dropped. In this example, we have three co-exisiting RID spaces and three table fragments.

In one embodiment, a transaction inserts into a table fragment until the next merge begins. But the lifespan of the table fragment is determined by the commit or abort of the last transaction that needs that fragment.

In another embodiment, a transaction begins in the current RID space. A transaction will be alive in the RID space through a counter mechanism. For example, when a transaction starts, it increases a counter in the current RID space. When the transaction ends, it decrements a counter in its own RID space. Accordingly, when a RID space gets a counter of 0, if it is in the current RID space, the current RID space should be kept alive. Otherwise, the RID space with a zero counter can be dropped.

In this embodiment, table fragment 2 is part of all three RID spaces 0, 1 and 2. RID space 0 is kept alive, because the last Xact 1 1112 is still alive and it completes at point 1114. Suppose this same long running transaction Last Xact 1 1112 inserts row "b" into table fragment 2, this transaction is in RID space 0. Thus, table fragment 2 is part of RID spaces 0, 1 and 2. In contrast, table fragment 1 is part of RID spaces 0 and 1 and table fragment 0 is only part of RID space 0. When the last Xact 1 1112 completes at point 1114, RID space 9 can be dropped.

There are three table fragments 0-2 in RID Space 0, while fragment 1 is also part of RID space 1 and fragment 2 is also part of RD spaces 1 and 2. In one embodiment, once a RED space is dropped, all table fragments that are not in other RID spaces are also dropped. So in this scenario, the counter for table fragment 0 is set to 0, because it is only used in RID space 0; while table fragment 2 has a counter of 3, because it is used in RID spaces 0, 1 and 2.

In another embodiment, in determining whether RID space 0 can be discarded, all counters of table fragments that within that RID space are decremented. Upon the destruction of RID space 0 1104, the counter on fragment 0 is decremented to 0, and the counter on fragment 1 is set to 1 and the counter on fragment 3 is set to 2. Therefore, table fragment 0 can be dropped as its counter is set to 0.

Figure 12:
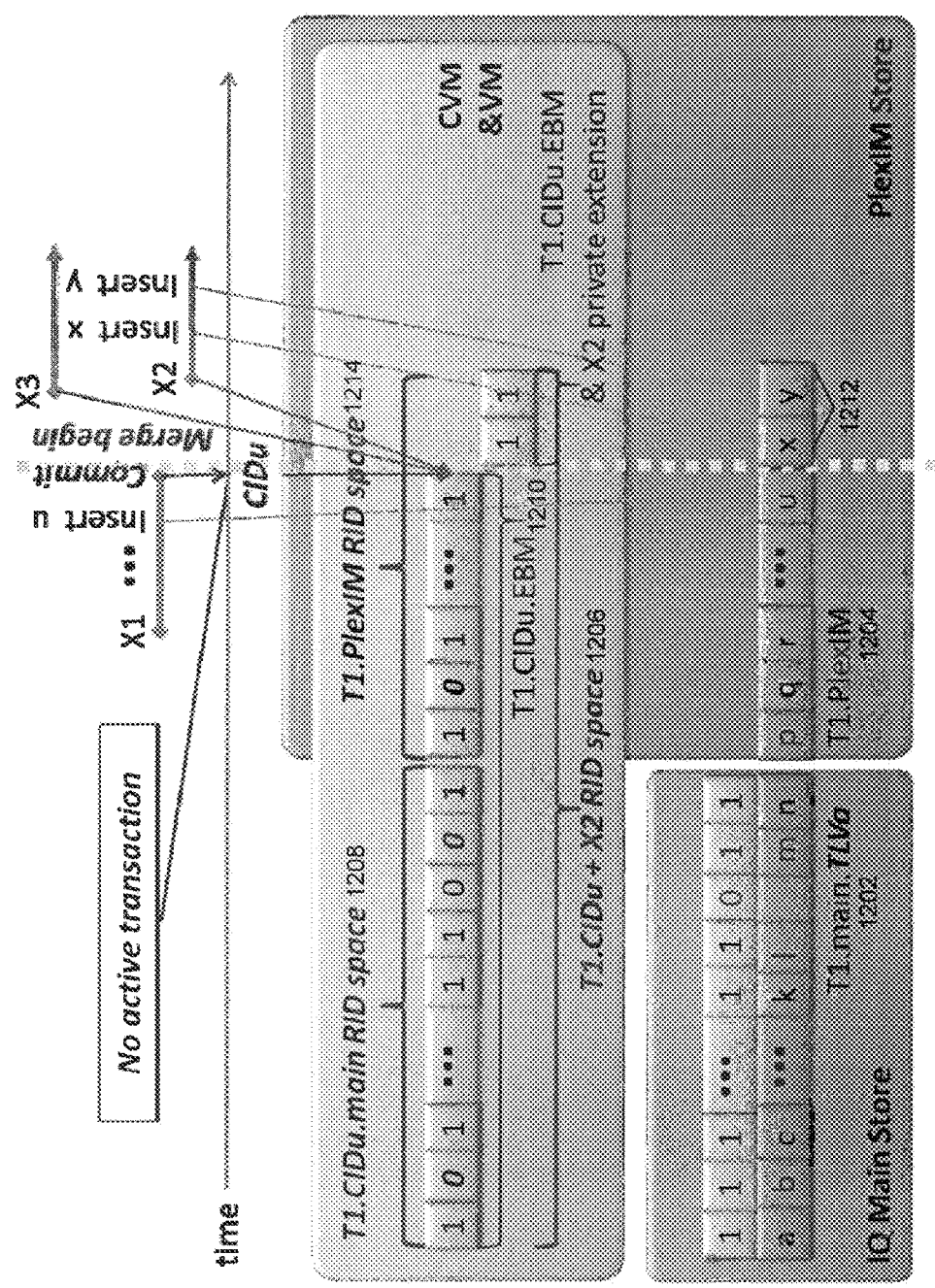
FIGS. 12-14 depict multiple RID spaces and a merge operation, according to an embodiment.

FIG. 12 depicts multiple RID spaces and a merge operation, according to an embodiment. As illustrate in this example, multiple RID spaces are used to handle background behavior of a merge operation. From the perspective of transaction x2, which starts after the beginning of the merge, x2 sees the pre-merge RID space 1206. Main store T1.main.TLVa 1202 and old delta store T1.PlexIM 1204 are within RID space 1206. RID space 1206 further includes bitmap T1.CIDu.EBM 1210 which spans T1.CIDu.main RID space 1208 and T1.PlexIM RID space 1214.

Figure 13:
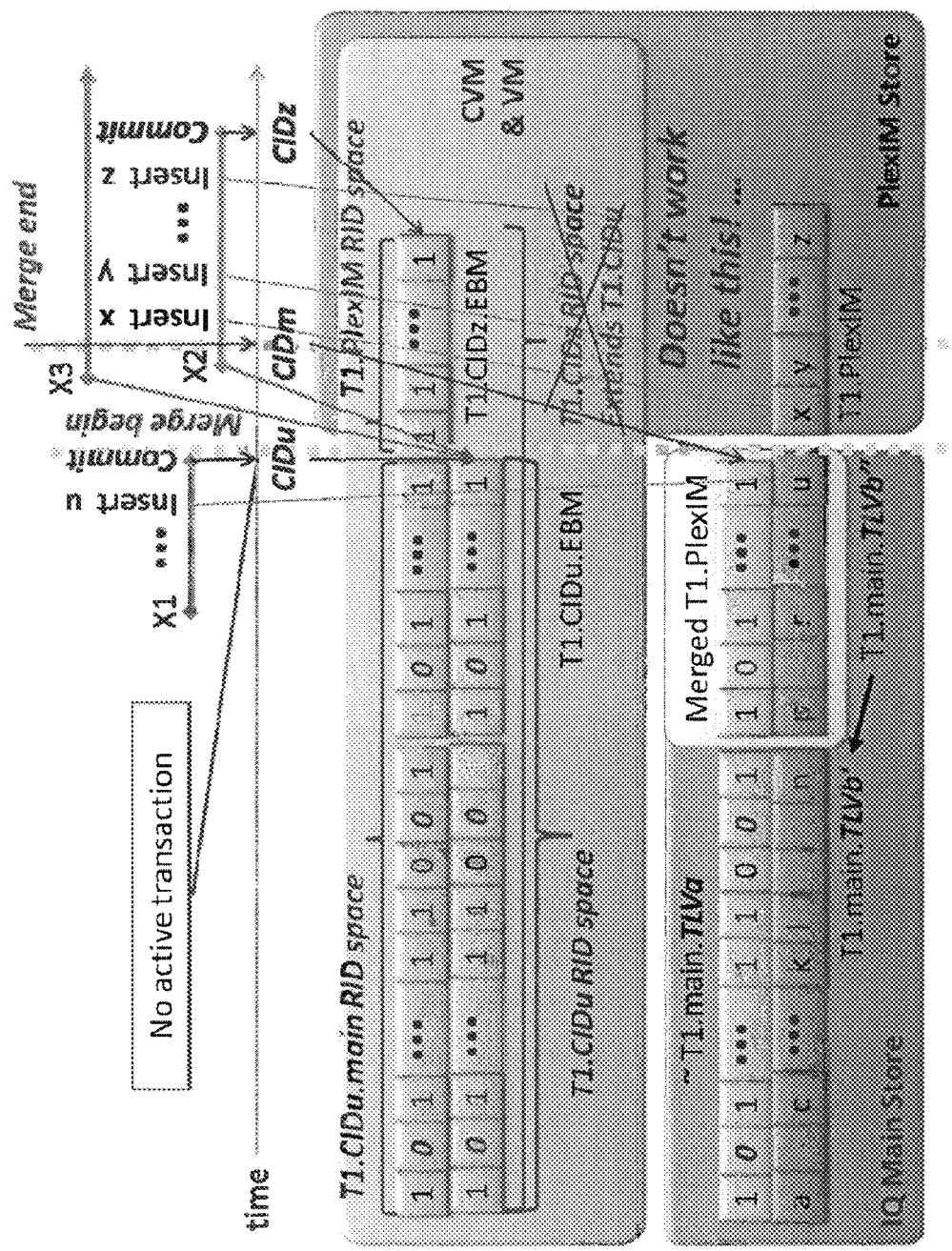

Transaction x1 inserts a row with value "a" into T1.Plex.IM store 1204 and then x1 commits. When the merge begins, rows in old delta T1.PlexIM 1204 are merged into main store T1.main.TVLa 1202. However, those rows may be scattered around in the main store. Further, the merge is difficult to handle, if there is ever growing new set of rows to be inserted in delta store and subsequently to be merged. In an embodiment, the new rows generated after the beginning of the merge are not inserted into old delta store T1.PlexIM 1204 once the merge starts. Instead, upon the start of the merge, new rows are inserted into a new fragment 1212 of the delta store. Thus, the old delta store T1.PlexIM 1204 is stabilized during the merge process. For example, the newly inserted rows with values "x" and "y" are inserted in new table fragment 1212. This example illustrates the scenario when merge begins. FIG. 13 below illustrates the scenario when merge completes.

Figure 14:
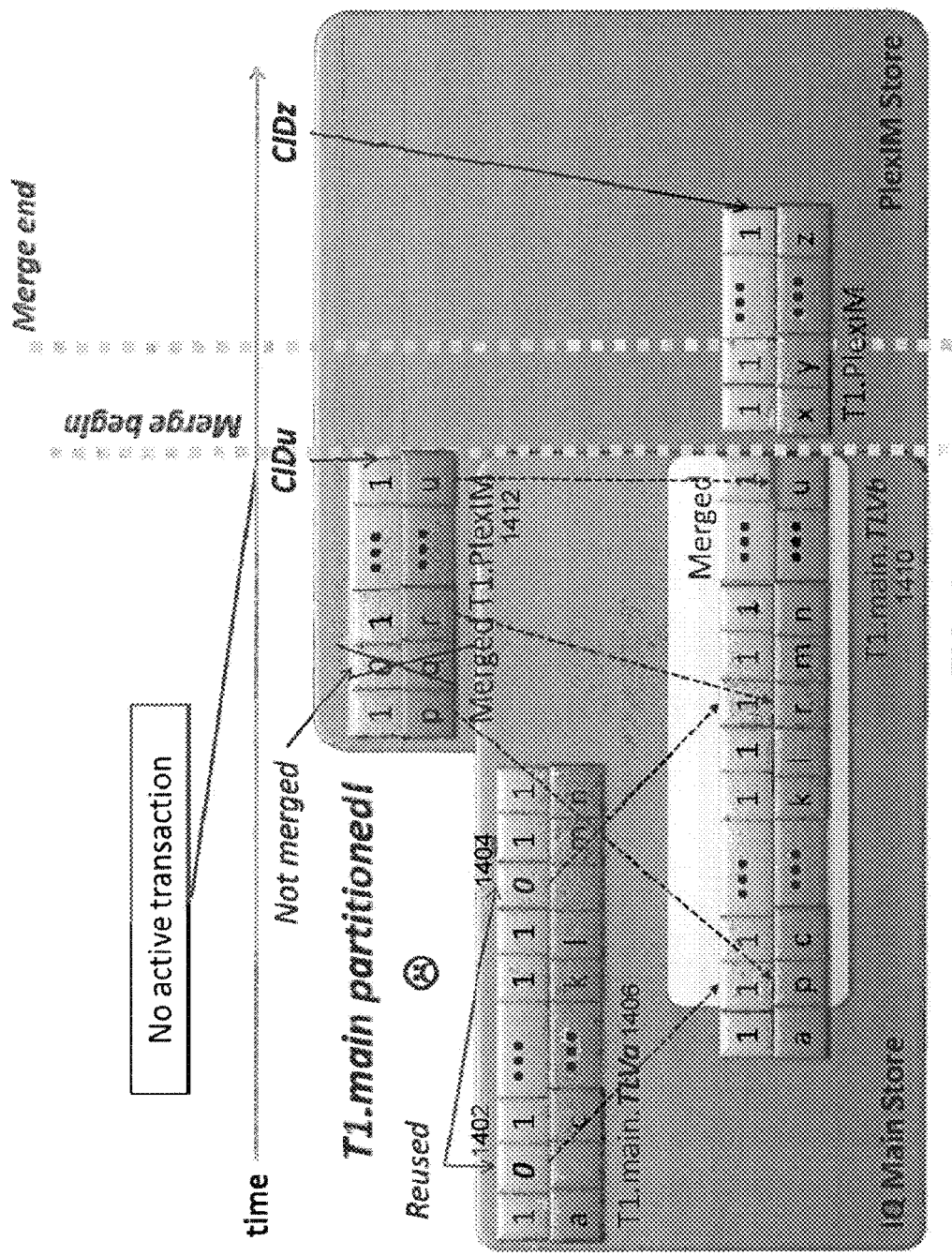

FIGS. 13-14 depict multiple RID spaces and a merge operation, according to an embodiment. In FIG. 13, the merge completes while transaction x2 is still executing. For the rows x, y and z which are inserted after the completion of the merge, they cannot be committed with the assumption that new fragment is appended to the old fragment in the delta store. Because a new table level version is created with the merge of the delta store, the rows have different RIDs within the delta store pre-merge and the new main store post-merge.

In FIG. 14, after the merge, rows "p" and "r" are inserted into the empty spaces 1402 and 1404 whose rows are deleted and become available in main store T1.main.TLVa 1406. In an embodiment, main store may be partitioned (not shown), which makes the positions of the rows "p" and "r" even more unpredictable after the merge. As noted above, the new main store T1.main.TLVb 1410 is not generated based on old main store T1.main.TLVa 1406 with certain rows from Merged T1.PlexIM store 1412 being appended. Because the merged rows may be scattered around all over the new main store, the RIDs in delta may be no longer valid after the merge due to the shifting of the rows.

Figure 15:
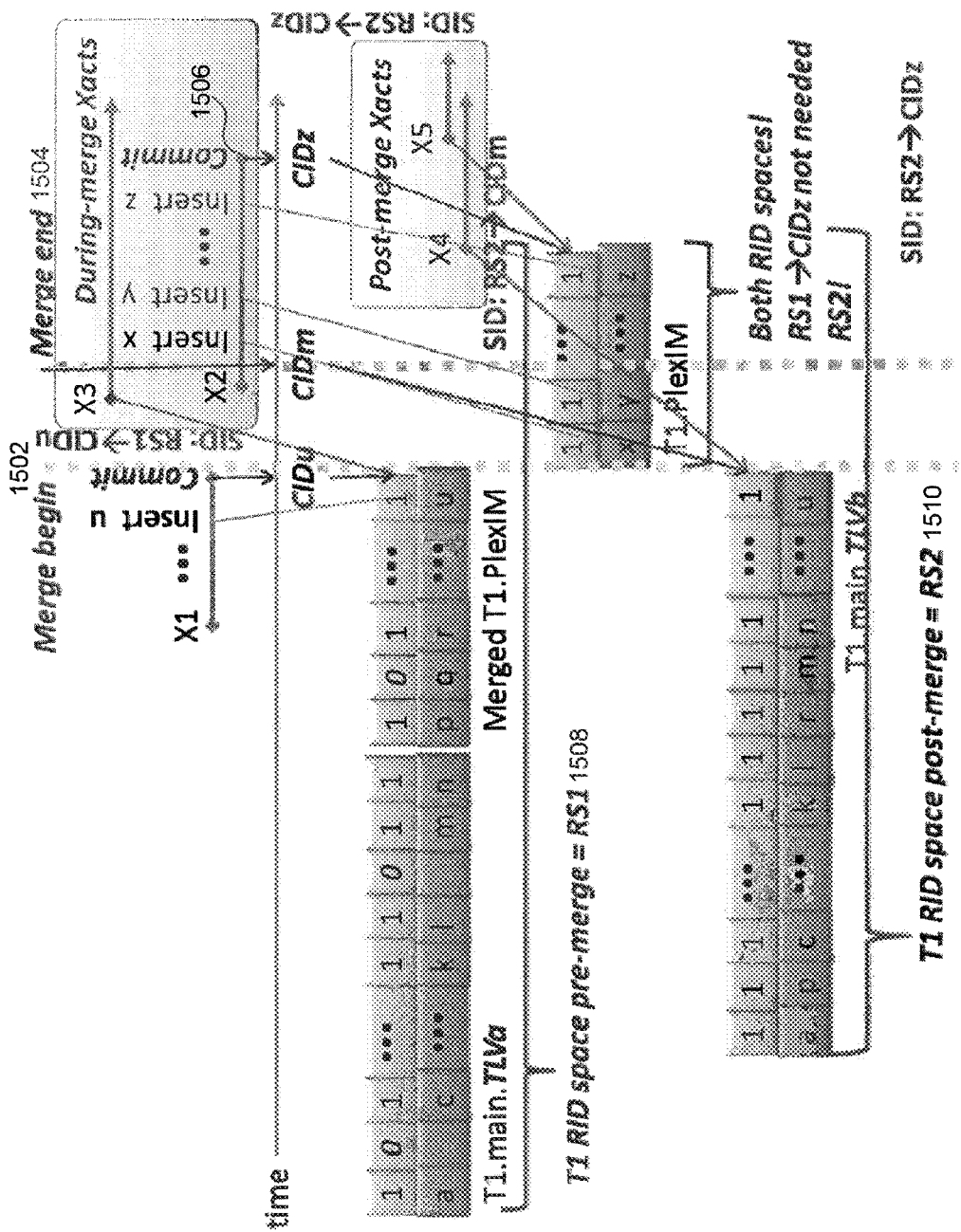
FIG. 15 depicts a during-merge transaction, according to an embodiment.

FIG. 15 depicts a during-merge transaction, according to an embodiment. In an embodiment, during-merge transactions, such as transactions x2 and x3 in FIG. 15, begin during merge process and complete after merge. FIG. 15 illustrates how such during-merge transactions behave at DIAL time and at commit time. Some time after merge begins at 1502, transaction x2 begins in pre-merge RID space RS1 1508.

At time 1504, merge completes and transaction x2 is still active. Upon the execution of the DML statements, such as insert operations of X, Y and Z, x3 is the single reader of its private writes and extends pre-merge RID space RS1 1508. The data changes generated by the DML are recorded in private FBM, insert BM or delete BM (Ins/DelBM) within pre-merge RID space RS1 1508.

At time 1506, transaction x2 commits. The writes become public to future post-merge transactions. As Ins/DelBM are converted to post-merge RID space 1510, and private EBM is discarded. Accordingly, upon the application of Ins/DelBM, post-merge RID space 1510 is extended.

Figure 16:
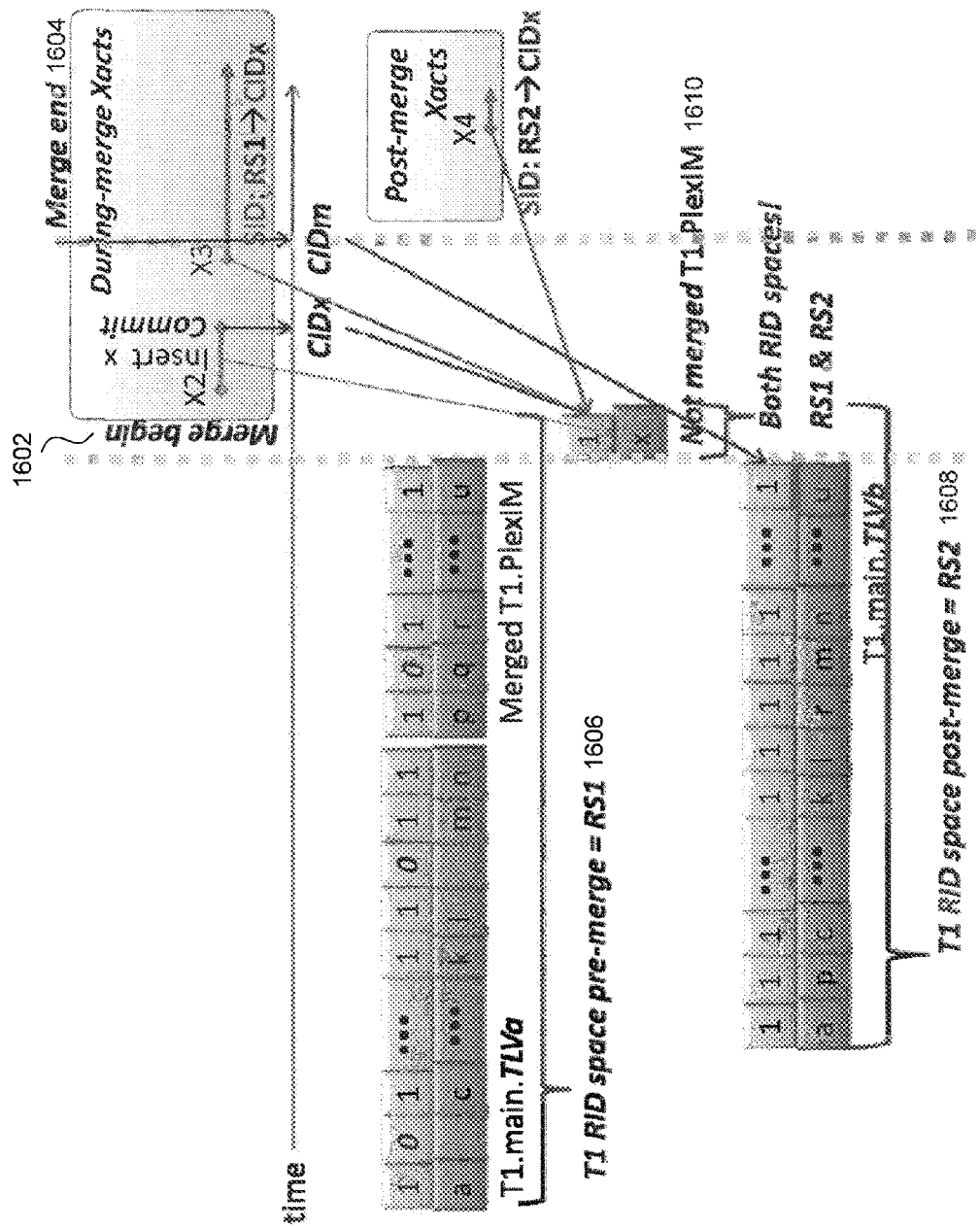
FIG. 16 depicts a twilight transaction, according to an embodiment.

FIG. 16 depicts a twilight transaction, according to an embodiment. In an embodiment, the twilight transactions, such as transactions x2 in FIG. 16, begin and end during merge. FIG. 16 illustrates how such twilight transactions behave at DML time and at commit time.

After the merge begins at 1602, transaction x2 begins. Transaction x2 inserts row X into table T1. Upon the execution of the DML statements, such as insert operation of X, x2 is the single reader of its private writes and extends pre-merge RID space RS1 1606. The data changes generated by the DML are recorded in private EBM, insert BM or delete BM (Ins/DelBM) within pre-merge RID space RS1 1606.

Upon the commit of x2, the writes become public to future pre-merge transactions. The application of Ins/DelBM extends pre-merge RID space RS1 1606.

At time point 1604, the merge completes. The writes become public to future post-merge transactions. If needed by active snapshots, pre-merge Ins/DelBM is kept. In addition, copies of Ins/DelIM are created within post-merge RID space RS2 1608. Accordingly, the application of post-merge Ins/DelBM extends post-merge RID space RS2 1608.

According to an embodiment, the data changes generated by the DML of x2 are accumulated in delta store Not merged Plex.IM 1610, which need to be visible in both pre-merge RID space RS1 1606 and post-merge RID space RS2 1608.

According to another embodiment, transactions that are active during the merge are handled in the similar fashion. These transactions start and operates on a table through the DML statements, and the data changes are recorded an old delta store. Upon the start of the merge, the old delta store is merged with the old main store. The subsequent data changes of the transactions are accumulated in a new delta store. Thus, the new DML operations move to the new delta store. From now on, the transactions behave like transactions start during the merge as described in FIGS. 15-16. Likewise; the new delta store need to be visible in both pre and post-merge RID spaces.

Example Computer System Implementation

Embodiments shown in FIGS. 1-16, or any part(s) or function(s) thereof, may be implemented using hardware, software modules, firmware, tangible computer readable media having instructions stored thereon, or a combination thereof and may be implemented in one or more computer systems or other processing systems.

Figure 17:
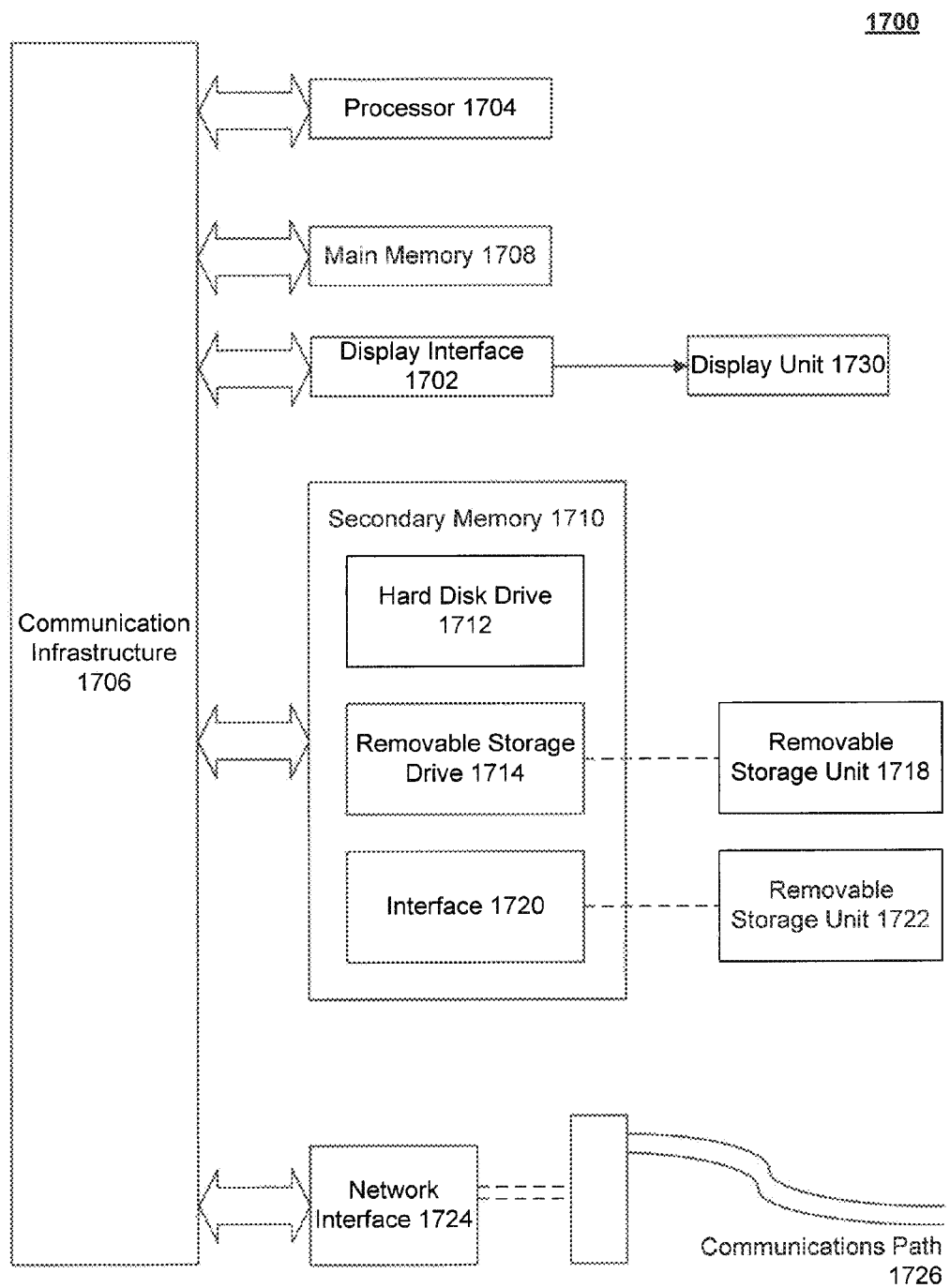
FIG. 17 is a diagram of an example computer system in which embodiments can be implemented, according to an embodiment.

FIG. 17 illustrates an example computer system 1700 in which embodiments, or portions thereof, may be implemented as computer-readable code. For example, MRSE 115, including its components, as shown in FIG. 2, can be implemented in computer system 1700 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-16.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments are described in terms of this example computer system 1700. After reading this description, it will become apparent to a person skilled in the relevant art how to implement embodiments of the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1704 may be a special purpose or a general purpose processor device. As will be appreciated by persons skilled in the relevant art, processor device 1704 may also be a single processor in a multi-core/multiprocessor system, such system operating alone, or in a cluster of computing devices operating in a duster or server farm. Processor device 1704 is connected to a communication infrastructure 1706, for example, a bus, message queue, network, or multi-core message-passing scheme.

Computer system 1700 also includes a main memory 1708, for example, random access memory (RAM), and may also include a secondary memory 1710. Secondary memory 1710 may include, for example, a hard disk drive 1712, removable storage drive 1714. Removable storage drive 1714 may comprise a floppy disk drive, a magnetic tape drive, an optical disk drive, a flash memory, or the like. The removable storage drive 1714 reads from and/or writes to a removable storage writ 1718 in a well-known manner. Removable storage unit 1718 may comprise a floppy disk, magnetic tape, optical disk, etc. which is read by and written to by removable storage drive 1714. As will be appreciated by persons skilled in the relevant art, removable storage unit 1718 includes a computer usable storage medium having stored therein computer software and/or data.

In alternative implementations, secondary memory 1710 may include other similar means for allowing computer programs or other instructions to be loaded into computer system 1700. Such means may include, for example, a removable storage unit 1722 and an interface 1720. Examples of such means may include a program cartridge and cartridge interface (such as that found in video game devices), a removable memory chip (such as an EPROM, or PROM) and associated socket, and other removable storage units 1722 and interfaces 1720 which allow software and data to be transferred from the removable storage unit 1722 to computer system 1700.

Computer system 1700 may also include a network interface 1724. Network interface 1724 allows software and data to be transferred between computer system 1700 and external devices. Network interface 1724 may include a modem, a network interface (such as an Ethernet card), a communications port, a PCMCIA slot and card, or the like. Software and data transferred via network interface 1724 may be in the form of signals, which may be electronic, electromagnetic, optical, or other signals capable of being received by network interface 1724. These signals may be provided to network interface 1724 via a communications path 1726. Communications path 1726 carries signals and may be implemented using wire or cable, fiber optics, a phone line, a cellular phone link, an RE link or other communications channels.

In this document, the terms "computer program medium" and "computer usable medium" are used to generally refer to media such as removable storage unit 1718, removable storage unit 1722, and a hard disk installed in hard disk drive 1712. Computer program medium and computer usable medium may also refer to memories, such as main memory 1708 and secondary memory 1710, which may be memory semiconductors (e.g. DRAMs, etc.).

Computer programs (also called computer control logic) are stored in main memory 1708 and/or secondary memory 1710. Computer programs may also be received via network interface 1724. Such computer programs, when executed, enable computer system 1700 to implement embodiments as discussed herein. In particular, the computer programs, when executed, enable processor device 1704 to implement the processes of embodiments of the present invention, such as the stages in the methods illustrated by flowchart 300 of FIG. 3, discussed above. Accordingly, such computer programs represent controllers of the computer system 1700. Where embodiments are implemented using software, the software may be stored in a computer program product and loaded into computer system 1700 using removable storage drive 1714, interface 1720, and hard disk drive 1712, or network interface 1724.

Embodiments of the invention also may be directed to computer program products comprising software stored on any computer useable medium. Such software, when executed in one or more data processing device(s), causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method for a column-based in-memory database comprising a main store and a delta store, the method comprising:

allowing, by the main store, non-concurrent transactions on a same table, wherein the main store is configured to identify a table version;

allowing, by the delta store, concurrent transactions on the same table, wherein the delta store is configured to identify a row version;

establishing a local row identification (RID) space for a table fragment, wherein the data of the same table is stored in one or more main table fragments in the main store and in one or more delta table fragments in the delta store, wherein the table fragment has a local RID space;

establishing a global RID space for the table version, the global RID space comprising a current main table fragment and a current delta table fragment;

processing a transaction that generates data changes in a table of the column-based in-memory database, through insert, update or delete statements of the transaction;

performing a merge of the delta store to the main store, wherein the merge generates a new global RID space for the table version; and generating a new delta table fragment at a beginning of the merge for the new global RID space, wherein the new delta table fragment becomes the current delta table fragment.

2. The method of claim 1, further comprising:

wherein the table has a plurality of table versions represented by a plurality of row-visibility bitmaps, the table version providing transaction-consistent snapshots of the table visible to transactions according to transactional snapshot isolation rules in a plurality of global RID spaces, and wherein each global RID space contains an ordered sequence of table fragments, one main table fragment followed by the one or more delta table fragments, each with its local RID space, and wherein a last delta fragment in each global RID space is a current delta fragment, and wherein each global RID space is a one-based collection of integer global RIDs (Row IDs) describing global positions of rows of the table version in its underlying ordered sequence of the main table fragments and the one or more delta table fragments, and wherein a most recently created global RID space is a current global RID space.

3. The method of claim 2, wherein upon a start of the transaction, the transaction is attached to the current global RID space of each table that the transaction accesses and processes, until completion of processing, within the global RID space attached by the transaction, and wherein new rows and new row versions created by the insert and the update statements are physically inserted in the current delta table fragment and marked as valid using global RID bitmaps, and old rows and old row versions deleted by the delete or update statements are logically marked as invalid using the global RID bitmaps, and wherein the global RID bitmaps of each table modified by the transaction correspond to the global RID space associated with the table and the transaction.

4. The method of claim 3, further comprising:
creating a new version for each table modified by the transaction, upon successful completion of the transaction, wherein each of the new version is created in the current global RID space of the table, and
translating global RID bitmaps representing inserted and deleted rows and row versions, which, during the processing of the transaction, correspond to a previous RID space attached to the table within the transaction, to the current RID space if the current RID space is different from the previous RID space attached to the table within the transaction.

5. The method of claim 2, wherein the delta store accumulates the data changes.

6. The method of claim 5, wherein the merge occurs concurrently with the processing the transaction, without blocking the transaction, and
wherein the delta table fragment and the main table fragment which were current before the merge become merged table fragments
wherein the merge creates a new main table fragment, which becomes a new current main table fragment after completion of the merge.

7. The method of claim 6,
wherein, from a point after the beginning of the merge, the new rows and the row versions created by the insert and update statements are inserted into the new delta table fragment, and
wherein RID spaces which exist at the beginning of the merge, including the current RID space, are extended by appending the new delta table fragment at an end of the ordered sequence of table fragments, and
wherein transactions which are open at the beginning of the merge continue processing of the table within an extended RID space where the transactions were originally attached, and
wherein new transactions which begin after the beginning of the merge and before the completion of the merge are attached for the table within an extended current RID space.

8. The method of claim 7, further comprising:
generating the new main table fragment at the completion of the merge,
wherein rows from the merged delta fragment, which are inserted and committed and not deleted or whose deletion is not yet committed, are transferred in the new main table fragment, and
wherein rows from the merged main fragment, which are not yet deleted or whose deletion is not yet committed, are transferred to the new main table fragment, and
wherein rows from the merged delta fragment, which are inserted and not yet committed are transferred to the new current delta fragment.

9. The method of claim 8, further comprising:
converting the new main table fragment to the current main table fragment at the completion of the merge;
generating a new RID space, which contains two table fragments in an order of the current main table fragment and the current delta table fragment, wherein the new RID space becomes the current RID space; and
generating a mapping, from a previous global RID space to the current global RID space for rows moved from the table fragments of the previous RID space to table fragments of the current RID space,
wherein transactions which are open at the completion of the merge continue processing of the table within RID spaces attached by the transactions, and
wherein new transactions which begin after the completion of the merge and before a beginning of a next merge are attached for the table to the current RID space.

10. The method of claim 2, wherein each global RID space is maintained as long as either the global RID space is current or an active transaction is attached to the global RID space, and wherein each table fragment is maintained as long as an existing global RID space contains the table fragment.

11. A system, comprising:
a memory comprising a column-based in-memory database, a main store and a delta store; and
one or more hardware processors coupled to the memory and configured to:
allow, by the main store, only non-concurrent transactions on a same table, wherein the main store is configured to identify a table version;
allow, by the delta store, concurrent transactions on the same table, wherein the delta store is configured to identify a row version; and
establish a local row identification (RID) space for a table fragment, wherein for each table in the column-based in-memory database, the data of the table is stored in one or more main table fragments in the main store and in one or more delta table fragments in the delta store, wherein each table fragment has a local RID space;
establish a global RID space for the table version, the global RID space comprising a current main table fragment and a current delta table fragment;
process a transaction that generates data changes in a table of the column-based in-memory database, through insert, update or delete statements of the transaction;
perform a merge of the delta store to the main store, wherein the delta store accumulates the data changes and the merge generates a new global RID space for the table version; and
generate a new delta table fragment at a beginning of the merge for the new global RID space, wherein the new delta table fragment becomes the current delta table fragment.

12. The system of claim 11, wherein the table has a plurality of table versions represented by a plurality of row-visibility bitmaps, the table version providing transaction-consistent snapshots of the table visible to transactions according to transactional snapshot isolation rules in a plurality of global RID spaces, and
wherein each global RID space contains an ordered sequence of table fragments, one main table fragment followed by the one or more delta table fragments, each with its local RID space, and
wherein a last delta fragment in the global RID space is a current delta fragment, and
wherein a global RID space is a one-based collection of integer global RIDs (Row IDs) describing global positions of rows of the table version in its underlying ordered sequence of the main table fragments and the one or more delta table fragments, and
wherein a most recently created global RID space is a current global RID space.

13. The system of claim 12, wherein the one or more hardware processors are further configured to:

maintain each global RID space as long as either the global RID space is current or an active transaction is attached to the global RID space; and maintain each table fragment as long as an existing global RID space contains the table fragment.

14. The system of claim 12, wherein upon the start of the transaction, the transaction is attached to the current global RID space of each table that the transaction accesses and processes, until completion of processing, within the global RID space attached by the transaction, and wherein new rows and new row versions created by the insert and the update statements are physically inserted in the current delta table fragment and marked as valid using global RID bitmaps, and old rows and old row versions deleted by the delete or update statements are logically marked as invalid using the global RID bitmaps, and wherein the global RID bitmaps of each table modified by the transaction correspond to the global RID space associated with the table and the transaction.

15. The system of claim 14, wherein the one or more hardware processors are further configured to:

create a new version for each table modified by the transaction, upon successful completion of the transaction, wherein each of the new version is created in the current global RID space of the table; and translate global RID bitmaps representing inserted and deleted rows and row versions, which, during the processing of the transaction, correspond to a previous RID space attached to the table within the transaction, to the current RID space if the current RID space is different from the previous RID space attached to the table within the transaction.

16. The system of claim 12, wherein the delta store accumulates the data changes.

17. The system of claim 16, wherein the one or more hardware processors are further configured to conduct the merge concurrently with the processing the transaction, without blocking the transaction, and wherein the delta table fragment and the main table fragment which were current before the merge become merged table fragments, and wherein the merge creates a new main table fragment, which become new current table fragments after completion of the merge.

18. The system of claim 17, wherein, from a point after the beginning of the merge, the new rows and the row versions created by the insert and update statements are inserted into the new delta table fragment, and wherein RID spaces which exist at the beginning of the merge, including the current RID space, are extended by appending the new delta table fragment at an end of the ordered sequence of table fragments, and wherein transactions which are open at the beginning of the merge continue processing of the table within an extended RID space where the transactions were originally attached, and wherein new transactions which begin after the beginning of the merge and before the completion of the merge are attached for the table within an extended current RID space.

19. The system of claim 18, wherein the one or more hardware processors are further configured to:

generate the new main table fragment at the completion of the merge, wherein rows from the merged delta fragment, which are inserted and committed and not deleted or whose deletion is not yet committed, are transferred in the new main table fragment, and wherein rows from the merged main fragment, which are not yet deleted or whose deletion is not yet committed, are transferred to the new main table fragment, and wherein rows from the merged delta fragment, which are inserted and not yet committed are transferred to the new current delta fragment.

20. The system of claim 19, wherein the one or more hardware processors are further configured to:

convert the new main table fragment to the current main table fragment at the completion of the merge;

wherein the system further comprises:

a new RID space generator, configured to generate a new RID space, which contains two table fragments in an order of the current main table fragment and the current delta table fragment, wherein the new RID space becomes the current RID space; and a RID space mapper, configured to generate a mapping, from a previous global RID space to the current global RID space for all rows moved from the table fragments of the previous RID space to table fragments of the current RID space, wherein transactions which are open at the completion of the merge continue processing of the table within RID spaces attached by the transactions, and wherein new transactions which begin after the completion of the merge and before a beginning of a next merge are attached for the table to the current RID space.

21. A computer program product comprising a computer readable storage medium having instructions encoded thereon that, when executed by a processor, cause the processor to perform operations comprising:

allowing, by a main store in a database, only non-concurrent transactions on a same table, wherein the main store is configured to identify a table version;

allowing, by a delta store in the database, concurrent transactions on the same table, wherein the delta store is configured to identify a row version; and establishing a local row identification (RID) space for a table fragment, wherein for each table in the database, the data of the table is stored in one or more main table fragments in the main store and in one or more delta table fragments in the delta store, wherein each table fragment has a local RID space;

establishing a global RID space for the table version, the global RID space comprising a current main table fragment and a current delta table fragment;

processing a transaction that generates data changes in a table of the column-based in-memory database, through insert, update or delete statements of the transaction;

performing a merge of the delta store to the main store, wherein the delta store accumulates the data changes and the merge generates a new global RID space for the table version;

generating a current delta table fragment at a beginning of the merge for the new global RID space, wherein the new delta table fragment becomes the current delta table fragment.

22. The computer program product of claim 21, wherein the table has a plurality of table versions represented by a plurality of row-visibility bitmaps, the table version providing transaction-consistent snapshots of the table visible to transactions according to transactional snapshot isolation rules in a plurality of global RID spaces, and wherein each global RID space contains an ordered sequence of table fragments, one main table fragment followed by the one or more delta table fragments, each with its local RID space, and wherein a last delta fragment in the global RID space is a current delta fragment, and wherein a global RID space is a collection of one-based global RIDs (Row IDs) describing global positions of rows of the table version in its underlying ordered sequence of the main table fragments and the one or more delta table fragments, and wherein a most recently created global RID space is a current global RID space.

* * * * *